(12) United States Patent
Mah

(10) Patent No.: US 10,776,984 B2
(45) Date of Patent: Sep. 15, 2020

(54) COMPOSITOR FOR DECOUPLED RENDERING

(71) Applicant: Layla Mah, Lowell, MA (US)

(72) Inventor: Layla Mah, Lowell, MA (US)

(73) Assignee: INSIGHTFULVR, INC, Lowell, MA (US)

( * ) Notice: Subject to any disclaimer, the term of this patent is extended or adjusted under 35 U.S.C. 154(b) by 0 days.

(21) Appl. No.: 16/184,419

(22) Filed: Nov. 8, 2018

(65) Prior Publication Data

US 2020/0151939 A1 May 14, 2020

(51) Int. Cl.
| | |
|---|---|
| *G06T 15/04* | (2011.01) |
| *G06T 15/20* | (2011.01) |
| *G06T 15/00* | (2011.01) |
| *A63F 13/52* | (2014.01) |
| *A63F 13/40* | (2014.01) |

(52) U.S. Cl.
CPC ............ *G06T 15/04* (2013.01); *G06T 15/005* (2013.01); *G06T 15/20* (2013.01); *A63F 13/40* (2014.09); *A63F 13/52* (2014.09); *A63F 2300/538* (2013.01); *A63F 2300/66* (2013.01)

(58) Field of Classification Search
CPC ..... G06T 15/04; G06T 15/005; G06T 19/003; G06T 17/00; G06T 19/00; G06T 15/00
See application file for complete search history.

(56) References Cited

U.S. PATENT DOCUMENTS

| | | |
|---|---|---|
| 4,435,803 A | 3/1984 | Das et al. |
| 5,030,853 A | 7/1991 | Vinal |
| 5,105,105 A | 4/1992 | Vinal |
| 5,760,719 A | 6/1998 | Graf |
| 6,438,651 B1 | 8/2002 | Slane |
| 7,545,381 B2 | 6/2009 | Huang et al. |
| 7,657,891 B2 | 2/2010 | Jensen et al. |

(Continued)

OTHER PUBLICATIONS

Asynchronous SpaceWarp. (n.d.). Retrieved Jul. 24, 2018 from the Oculus PC SDK Developer Guide at <https://developer.oculus.com/documentation/pcsdk/latest/concepts/asynchronous-spacewarp/>. 4 pages.

(Continued)

*Primary Examiner* — Haixia Du
(74) *Attorney, Agent, or Firm* — Shook, Hardy & Bacon, L.L.P.

(57) ABSTRACT

Techniques involve rendering computing graphics from decoupled inputs. Content updates (e.g., geometry, textures, lighting, audio, etc.) for 3D objects and/or a 3D scene can provided to a compositor at different rates. The compositor buffers the inputs, interpolates between buffered values, binds data for each of the content updates, and triggers drawing the data to render a frame. If buffered data fails to satisfy some criteria, previous buffered values can be used instead of the buffered data, or a different function can be performed (e.g., extrapolation instead of interpolation). User inputs from one or more I/O components (e.g., a gamepad, keyboard, mouse, etc.) can be fed directly into the compositor, which can generate and use a 3D camera from the inputs to draw frames faster than the content updates occur. As such, the present compositor improves power efficiency, and reduces latency and increases smoothness of the input response.

19 Claims, 11 Drawing Sheets

(56) References Cited

U.S. PATENT DOCUMENTS

| | | | |
|---|---|---|---|
| 2003/0061332 A1 | 3/2003 | Narad et al. | |
| 2005/0283589 A1 | 12/2005 | Matsuo | |
| 2007/0171234 A1* | 7/2007 | Crawfis | G06T 15/04 345/587 |
| 2010/0053223 A1 | 3/2010 | Otsuka et al. | |
| 2011/0291943 A1* | 12/2011 | Thorn | G06F 3/0488 345/173 |
| 2012/0131309 A1 | 5/2012 | Johnson et al. | |
| 2013/0162781 A1* | 6/2013 | Hubner | H04N 5/2224 348/47 |
| 2014/0218367 A1* | 8/2014 | Ota | G06T 15/20 345/427 |
| 2016/0253774 A1 | 9/2016 | Grebe et al. | |
| 2016/0260246 A1 | 9/2016 | Oldcorn et al. | |
| 2016/0337252 A1 | 11/2016 | Eberle et al. | |
| 2017/0063733 A1 | 3/2017 | Lawson et al. | |
| 2017/0069054 A1* | 3/2017 | Ramadoss | G06T 1/20 |
| 2017/0227765 A1 | 8/2017 | Mammou et al. | |
| 2017/0302918 A1 | 10/2017 | Mammou et al. | |
| 2017/0302972 A1 | 10/2017 | Zhang et al. | |
| 2019/0038964 A1* | 2/2019 | Veeramani | G06F 3/0346 |

OTHER PUBLICATIONS

Asynchronous TimeWarp. (n.d.). Retrieved Jul. 24, 2018 from the Oculus Mobile SDK at <https://developer.oculus.com/documentation/mobilesdk/latest/concepts/mobile-timewarp-overview/>. 6 pages.
Notice of Allowance dated Apr. 5, 2020 in U.S. Appl. No. 16/184,415. 10 pages.

\* cited by examiner

COMPOSITOR FOR DECOUPLED RENDERING

BACKGROUND

Modern day computer graphics allow users to experience content in 3D using some kind of display (e.g., a television monitor, a computer monitor, a display in a head-mounted device or hand-held device, etc.) capable of presenting images of virtual 3D environments from different perspectives. To accomplish this, artists can design 3D scenes with 3D objects, specifying behaviors of the 3D objects, textures, lighting, sounds, etc. The 3D scene is loaded into a gaming system, VR headset, desktop computer, or some other suitable computing device, and software is used to render 2D images from the 3D scene. Due to the significant computational demands required to render real-time graphics, specialized graphics processing units (GPUs) can be used to accelerate the rendering process. Further, some content can be baked to file (e.g., cinematic scenes), which can also accelerate rendering. User inputs can control gameplay elements such as the movement of characters and other objects within the 3D scene. Likewise, user inputs can control the perspective of the view (e.g., a camera) into the 3D scene. The 3D objects, textures, and lighting are combined to render an image for display as a frame. The process is repeated to render and display successive frames.

SUMMARY

Embodiments described herein provide methods and systems for rendering computing graphics from decoupled inputs. More specifically, content updates (e.g., geometry, textures, lighting, audio, etc.) for 3D objects and/or a 3D scene can be generated and provided to a compositor at different rates. The compositor buffers the inputs, optionally interpolates between buffered values for an input, binds together data for each of the content updates, and draws the resulting data to render a frame. By allowing decoupled content inputs, an update rate for one or more of the content inputs can be selectively reduced, for example, to avoid unnecessary content updates and/or to reduce power consumption. In some embodiments, an evaluation of buffered data can be made against various criteria (e.g., whether the data is valid, at least as good as or better than a previous buffered value, etc.). If the buffered data fails to satisfy the criteria, one or more previous buffered values can be used instead of the buffered data to render a frame, or a different or modified function can be performed (e.g., extrapolation instead of interpolation). As such, dropped or corrupted data in an input stream need not impact an output stream.

In some embodiments, user inputs from one or more I/O components (e.g., a gamepad, keyboard, mouse, etc.) can be fed directly into the compositor, which can generate a 3D camera from the inputs and use the 3D camera to draw a frame. By feeding the user inputs directly into the compositor, motion-to-latency is reduced over prior techniques. Further, the compositor can operate on a loop that iterates at a different (and faster) rate than the content updates are generated and/or received. By iterating at a faster rate than the content updates, the compositor uses more user input samples than in prior techniques, improving the smoothness of the input response.

To facilitate improved rendering techniques, a new data structure is proposed. A logic-executing ring buffer (LERB) is a ring buffer with integrated logic that expands on conventional FIFO queuing. Whereas a conventional ring buffer simply loads incoming data into successive buffer positions, and reads data from (separate) successive buffer positions, a LERB includes logic that executes in association with each buffer position. To accomplish this, a LERB may be implemented with a series of logical ring stages and corresponding ring entries. The ring stages can be mapped to the ring entries using an indirection table (e.g., comprising pointers that associate one or more ring stages with one or more ring entries). Any or all of the ring stages can include a corresponding stage function that executes in association with a ring stage. Further, a LERB may include control logic that executes alone or in combination with the stage functions to advance the LERB.

For example, when a LERB receives incoming data, control logic and/or a stage function can load the incoming data into a ring stage (e.g., ring stage 1), and load associated data (e.g., the incoming data itself, data identified or otherwise referenced by the incoming data, etc.) into an associated ring entry (identified using the indirection table). Associated stage functions for any or all ring stages can execute (e.g., before advancing the LERB, while advancing the LERB, independently of advancing the LERB, some combination thereof), and in any order. The LERB can be advanced by passing data from one ring stage to the next and/or updating the indirection table to map an associated ring entry with the next ring stage (and to map a ring stage with the next ring entry). In some embodiments, control logic and/or a stage function can impact whether or how to advance the LERB (or manipulate data stored in or otherwise associated with a particular ring stage). Further, the LERB can advance at a designated rate, can be triggered to advance when it receives incoming data, and/or can be triggered to advance based on some other indication (e.g., receipt of a control signal, the occurrence of some designated event, or otherwise). The process can continue, loading incoming data into ring stage 1 and advancing the LERB (e.g., on one loop), and executing stage functions for any or all of the ring stages (e.g., on the same loop, a different loop, or some combination thereof). In some embodiments, ring stages can store transient data that gets passed from one ring stage to the next (e.g., for use by an associated stage function). Meanwhile, ring entries can store persistent data that does not move. Instead, data advances through the buffer by changing the mappings between ring stages and ring entries using control logic and/or stage functions. As such, a LERB is a flexible data structure that provides expanded functionality and improved memory management over prior techniques.

A LERB is capable of implementing a broad array of new capabilities and complex functionality not previously available with a traditional ring buffer. For example, LERB control logic and/or a stage function can implement data pinning. More specifically, logic associated with a particular ring stage can evaluate whether buffered data (e.g., data associated with a ring stage) satisfies some designated criteria (e.g., whether the data is valid, as good as or better than some other buffered value, etc.). If the buffered data fails to satisfy the criteria, control logic and/or the stage function can perform some action, such as bypassing a corresponding update to the indirection table. By way of nonlimiting example, before updating the indirection table to associate ring stage 3 with ring entry 2, the LERB can evaluate the data associated with ring entry 2. If the data fails to satisfy the criteria, the LERB can bypass the update to the indirection table for ring stage 3, which can result in maintaining a prior association, for example, between ring stage 3 and ring entry 1. In this example, ring stage 3 can be configured to use data associated with ring entry 1 instead of data associated with ring entry 2, or execute different logic (e.g., a different or modified function). As such, by using data pinning (or some other logic), a LERB improves upon conventional FIFO queuing used by a standard ring buffer by enabling more complex operations.

In an example application for graphics rendering, one or more LERBs can be implemented in a compositor to facilitate buffering decoupled inputs, interpolation, data pinning, and/or rendering. For example, each LERB can buffer or otherwise synchronize updates to a particular piece of content (e.g., geometry or texture updates for a particular 3D object or group of 3D objects, cinematic camera updates, etc.). Ring stages and/or ring entries can store data itself (e.g., the content updates) and/or handles, pointers, or other references to the data. Each LERB can be configured to update at any rate (e.g., based on different update rates for different decoupled inputs). The compositor can access buffered data stored in, or otherwise associated with the LERBs, and can trigger associated stage functions, for example, to render (or trigger rendering) frames based on the buffered data. Further, the compositor can be configured to operate on a loop that iterates at any rate (e.g., a different and/or faster rate than the content updates), for example, to improve the smoothness of a response to an input from an I/O component. One or more LERB stages (e.g., associated stage functions) can be configured to implement various rendering tasks such as loading a GPU, interpolation, drawing to the GPU, garbage collection, and the like. Any or all of the LERB stages can be configured to execute during a compositor update (i.e., an iteration of the compositor loop), a LERB update (i.e., while advancing the LERB), or some combination thereof. The compositor (e.g., any or all ring stages of a LERB) can be configured to execute on one or more processors, for example, a CPU, a GPU, or some combination thereof.

Many other applications of a LERB are possible, whether in software, hardware, or some combination thereof. For example, one or more LERBs is reducible to hardware (e.g., as an ASIC, FPGA, DSP, special design core, RISC architecture such as an ARM® chip, etc.). Further, one or more LERBs can be implemented in software (e.g., using code to assign ring entries, ring stages, an indirection table, and/or stage functions to parallel vectors or arrays and implement control logic). To facilitate the many applications, one or more LERBs may be implemented to be programmable. For example, one or more LERBs may include a programmable number of ring entries, number of ring stages, associated functions, pinning logic, and/or associated metadata. Additionally and/or alternatively, application-specific implementations (e.g., a compositor for rendering graphics from decoupled inputs) can be designed to be programmable, for example, providing configurable settings to allow a user to control interpolation type (e.g., off, linear, cubic, etc.), playback speed, metadata and the like. These and other applications are contemplated within the present disclosure.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Conventional rendering systems typically use an update loop to synchronize content updates. In gaming, for example, a gaming engine might generate gameplay and physics updates at 30 Hz or 60 Hz. In the case of gameplay, the gaming engine runs the update loop to determine various gameplay elements such as character movement, actions, damage, etc. Once gameplay elements have been updated, the gameplay engine updates physics (e.g., performs collision detection, etc.). Once physics are updated, determinations are made what objects to draw (geometry), what textures to use, what lighting to use, etc. Conventionally, the updated content elements (geometry, textures, lighting, audio, etc.) are provided at the same time as one another into a device CPU (i.e., the inputs are coupled), and the device CPU issues a draw call to the graphics API to draw the updates to the GPU.

Figure 1:
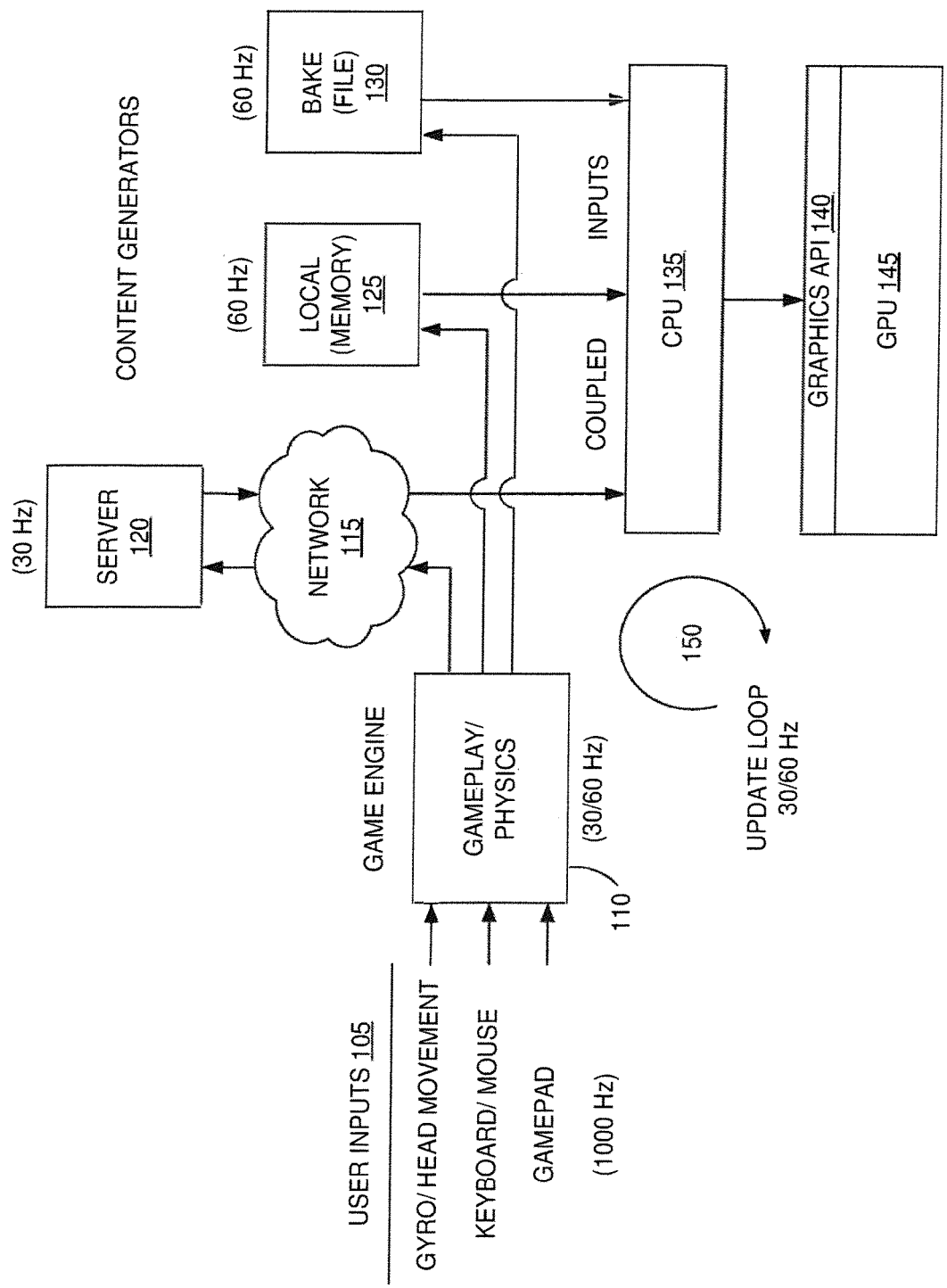
FIG. 1 is a block diagram of a prior rendering system.

One such prior technique for rendering computer graphics can be understood with reference to FIG. 1. User inputs 105 from various types of I/O components can be sampled and provided to game engine 110 for use in generating gameplay and physics updates. Various types of user inputs from one or more I/O components can be used, including inputs from a keyboard, mouse, gamepad, and the like. In some systems, user inputs can be measured by a gyro and/or accelerometer within an I/O device (e.g., a VR headset, controller, etc.) to provide an indication of orientation and/or movement. Although user inputs 105 can be sampled by an I/O component at a particular rate (e.g., 1000 Hz), conventional game engines (e.g., game engine 110) typically update at 30 or 60 Hz. At each update, game engine 110 provides gameplay and physics updates to one or more content generators such as server 120 (via network 115), local memory 125, and bake 130. The corresponding content generator(s) can use the updated gameplay and physics to generate updated content (e.g., geometry, textures, lighting, audio, etc.) and provide the updated content to CPU 135 as coupled inputs, that is, each set of updates is provided to CPU 135 at the same time. CPU 135 draws the updated content to GPU 145 using graphics API 140.

Game engine 110 typically performs its updates in lock step at a designated update rate, typically 30 or 60 Hz, and conventional rendering systems are typically driven by this update rate. Although some updates (e.g., audio) may in some cases run in a separate thread or at a different speed, generally all updates are coupled to the update rate of game engine 110, which operates as a global clock. As such, content updates are typically generated in lock step (even if running in separate threads and parallel), resulting in coupled inputs into CPU 135, corresponding calls to graphics API 140 and corresponding frames rendered by GPU 145. These interactions result in an effective update loop 150 for rendering, the speed of which depends on the update rate of game engine 110. Typically, if the update rate for a conventional game engine is changed (e.g., the update rate for gameplay and physics), the update rate for the other content updates also changes. Note that although gaming is used an example here, other conventional systems for rendering computer graphics generate content updates using an update loop and a similar configuration to that illustrated in FIG. 1.

Conventional techniques for rendering computer graphics have several shortcomings. For example, power and frame rate limitations are imposed on conventional hardware, limiting the quality of rendered content. Typically, rendering systems balance power demands against power limitations, particularly for systems that are powered by a battery. Generally, the amount of power required to run an update loop depends on the update rate. However, VR headsets have other significant power demands, such as powering device components including a screen, a wireless receiver, buttons and controller, backlight, and the like. Most VR headsets limit power consumption (e.g., 5 W) to avoid producing uncomfortable heat levels and to extend battery life. In order to limit power consumption, conventional VR headsets typically cap the rate of the update loop and the frame rate generated by the device. Typical games run at 30-60 fps (e.g., 30 fps for game consoles displaying on televisions, 60 fps for some fast-paced first person shooters, etc.). Typically, virtual reality headsets limit frame rates to slightly faster rates, such as 60-90 fps. By capping frame rates in conventional hardware, the quality of rendered content is therefore limited, as the human eye can perceive on the order of 1 kHz. As such, techniques are needed for reducing power consumption to enable longer battery life and reduced heat dissipation, and to facilitate improved quality.

Moreover, conventional techniques for rendering computer graphics have a limited ability to respond to user input. Generally, the update rate impacts the latency and smoothness of the system's input response. A sufficiently high update rate is necessary to capture a sufficiently smooth user input and reduce latency between samples. Regarding latency, users can notice differences in a system's input response, for example, between 60 Hz and 120 Hz. For some users, even 240 Hz can appear too slow. Regarding smoothness, if a user executes a gesture using a fluid movement, the effective fluidity of the system's response depends on capturing that movement with an adequate number of samples and using enough of the samples to generate a system response. Conventional rendering techniques which limit the frame rate (e.g., 30-60 fps for gaming consoles, 60-90 fps for VR headsets, etc.) process user inputs with undesirable amounts of latency and choppiness.

In conventional rendering techniques, latency and choppiness depend on the update rate, even if an input is sampled at a higher rate. For example, VR headsets typically sample inputs at 1000 Hz. Some mice are sampled at 5000 Hz. However, these sampled inputs get fed into a game engine, which updates at 60 Hz, for example. Therefore, even though a user input may initially be sampled at a higher rate, conventional game engines do not consume the sampled data that quickly, so the system's response time is limited by its update rate. For example, with respect to latency, assuming a particular VR input is sampled at 1000 Hz, but the update loop only runs at 60 Hz, the system's response can still include up to 60 ms of latency. With respect to smoothness, conventional systems typically perform some averaging of an input signal between updates, so these conventional systems do not act on each individual input sample. Instead a user's response is reflected as an average of the sampled inputs over a designated window. In a game that runs at 30 Hz, the smoothness of the gameplay action is correspondingly limited. Many people will notice a flickering or choppy system response using an update rate below 85 Hz. This is one reason why some conventional VR headsets update at 90 Hz. However, even 90 Hz is still too choppy for some users. As such, conventional techniques for rendering computer graphics process user inputs with undesirable amounts of latency and choppiness.

As such, embodiments described herein provide simple and efficient methods and systems for rendering computer graphics from decoupled inputs. Instead of coupling controller inputs with content generation and coupling content generation with rendering, present techniques (1) decouple user inputs from the update loop of the game engine, (2) decouple the generation of different types of content updates from one another, and/or (3) decouple the generation of content updates from the rendering of content. For example, by feeding user inputs directly into a compositor, rather than through the game engine, a compositor loop can render at a faster rate than the gameplay engine to make use of more input samples, thereby reducing latency and choppiness over prior techniques. Additionally and/or alternatively, inputs to the compositor delivering content updates can be decoupled in space and/or time, and the compositor can use interpolation to fill in gaps. By operating on decoupled inputs, the update rate of a particular input can be selectively reduced in order to reduce the power consumed by the compositor and the rendering process. For example, the update rate of some inputs such as texture and/or lighting can be reduced without significantly impacting the quality of the rendered output, or even without a perceptible impact to quality at all.

In some embodiments, user inputs sampled by one or more I/O components (e.g., controller inputs, keyboard, mouse, gyro, accelerometer, etc.) are broken out from the update loop and passed directly into a compositor that coordinates rendering so the user inputs can be used at a faster rate than in conventional rendering (e.g., 1000 Hz, 2000 Hz, 5000 Hz, etc.). The compositor can use the user inputs to generate a 3D camera (e.g., orientation and/or position for the 3D camera) that reflects the view into a 3D scene to be rendered. For example, the 3D camera can reflect where a user is looking at a current moment in time or where the user is expected to look at some time in the future (e.g., 1 ms, 5 ms, etc.). The user inputs can also be passed into the game engine so gameplay and physics can be updated using the user inputs. In some embodiments, the compositor runs at a faster rate (e.g., 1000 Hz) than the update loop for the game engine (e.g., 30 Hz, 60 Hz, 90 Hz, etc.). This configuration effectively short-circuits user inputs to graphics through a direct path (e.g., within one 1 kHz tick). In this manner, content (e.g., gameplay, physics, audio, etc.) is cut out of the user-input-to-graphics loop.

Feeding user inputs into the compositor produces a tight loop by bringing inputs and outputs closer together than in prior techniques. As such, this configuration reduces the motion-to-photon latency over conventional techniques. In conventional systems, by contrast, the input must travel all the way through the 30 or 60 Hz frame to the output, so the whole frame lies between the input and output. By breaking out the inputs from the conventional update loop, user input data can be consumed faster, and users can notice an improved system response in terms of both latency and smoothness. Even for systems that utilize a fixed frame rate (e.g., 60 fps), by feeding user inputs into the compositor, the user inputs can be queried by the compositor at a faster rate (e.g., 1000 Hz) than in prior techniques. As such, even though frames are updating on screen at 60 fps, latency is still significantly reduced.

In some embodiments, inputs from content generators (e.g., cinematic camera, geometry, textures, etc.) can be decoupled in space and/or time. This is in contrast to conventional rendering techniques, which operate on coupled inputs. More specifically, in prior techniques, inputs from content generators are coupled in time (meaning inputs occur at the same rate or rates that are related by some multiple integer) and/or coupled in space (meaning every update to geometry comes with an updated texture). If a frame gets dropped, prior techniques either produce a black frame or attempt to predict the missing data. One conventional rendering technique uses asynchronous space warp to determine what a particular pixel might look like in the future. More specifically, asynchronous space warp attempts to shift a previously rendered frame using a translated prior input to extrapolate a future position based on a velocity vector representing the motion of a corresponding object. Another conventional technique uses asynchronous time warp to shift a previously rendered frame to account for changes in head movement. If data necessary for such a prediction is not present, conventional rendering techniques can produce a black frame, a flicker, or the like.

By contrast, the present technique accepts inputs which are decoupled in space and/or time, and uses interpolation to render new frames that fill in gaps. As such, the present compositor can buffer or otherwise synchronize decoupled inputs from content generators updating at any rate (e.g., 15 Hz, 25 Hz, 30 Hz, 40 Hz, 60 Hz, etc.), interpolate between buffered values, and bind the results to generate coupled outputs. This configuration can facilitate significant power savings. For example, since different inputs (e.g., different pieces of a 3D world) can now be updated at different times, the update rate for a particular input can be reduced independent of the other inputs. By reducing the update rate of a particular input, fewer updates will occur, less processing is required (e.g., less updates need to be loaded), and power can be saved. For example, in 3D rendering, the update rate for textures can be reduced relative to the update rate for geometry without sacrificing user experience because, in many scenarios, the behavior of textures in the real world do not change as quickly as the position of corresponding objects. As such, instead of updating textures 30 or 60 times a second as in conventional techniques, for example, significant power can be saved by reducing the update rate (e.g., to 1 time a second, 10 times a second, etc.). In some cases, decoupling inputs and reducing the update rate for a conventionally coupled input can result in multiple orders of power savings over prior techniques.

In some embodiments, rendering can be improved through the use of a logic executing ring buffer (LERB). Generally, a LERB is a data structure that integrates logic into a ring buffer. A LERB may have any number of ring stages that integrate data and logic. An example implementation of a LERB may include an array or vector of ring entries storing persistent data, an array or vector of ring stages storing transient data, and an indirection table comprising an array or vector mapping ring entries to ring stages. One or all of the ring stages can have associated stage functions that execute with an associated ring stage. Further control logic can be implemented to advance the buffer, alone or in combination with one or more ring functions. For example, incoming transient data can be loaded into (e.g., stored in or otherwise associated with) a first ring stage, and a corresponding stage function can execute to load (e.g., store or otherwise associate) corresponding persistent data in (or with) a first ring entry. As new data comes in and the LERB advances, transient data stored in or otherwise associated with the ring stages can be passed to a subsequent ring stage, and an associated entry in the indirection table can be updated so the subsequent ring stage points to the persistent data stored in a prior ring entry (e.g., so a second ring stage points to the first ring entry). In this manner, persistent data can logically advance through the buffer (e.g., through each of the ring stages), without the persistent data actually moving, by updating the indirection table to advance the logical stage associated with a particular ring entry.

LERB control logic and/or stage functions enable a broad array of new capabilities and complex functionality not previously available with a traditional ring buffer. In one example, data can be pinned to a particular stage. More specifically, logic at a particular stage (e.g., control logic and/or logic for an associated ring function) can evaluate whether or not to replace existing data associated with the stage with incoming data into the stage (or data otherwise associated with a prior stage), for example, based on an evaluation of the incoming data and/or a comparison between the existing data and the incoming data. Any type of metric may be used as criteria for the evaluation. As such, a LERB can pin data to a particular stage until the stage gets valid (or better) data to replace it. Data pinning is one example technique in which a LERB improves upon conventional FIFO queuing in a standard ring buffer by enabling more complex operations.

The types of functions that can be programmed into a LERB are essentially limitless. In one example application for rendering graphics, a series of stages can be designed to perform successive functions to facilitate rendering. For example, a LERB can be loaded with content updates (e.g., geometry, textures, etc.) or handles/pointers to content updates, and a stage function can be programmed to draw the content updates to a GPU. In an example implementation where a LERB executes on a CPU, successive stage functions can be programmed to load the GPU, draw to the GPU, and garbage collect. Additionally and/or alternatively, a stage function can be programmed to perform (or trigger the GPU to perform) interpolation between successive content updates. A compositor can be implemented with one or more LERBs, for example, one for each piece of incoming data to be updated. For example, each object in a 3D scene may have a LERB for geometry and a LERB for texture. As such, the LERBs can buffer or otherwise synchronize incoming data, tie together decoupled input streams using interpolation to create coupled output streams, and draw the output streams to a GPU. This is simply one example implementation that uses a LERB. Other uses are possible in graphics rendering, as well as other applications such as audio, robotics, automation, financial trading, real-time data processing, etc.

Many other applications of a LERB are possible, whether in software, hardware, or some combination thereof. To facilitate the many applications possible with a LERB, in some embodiments, a LERB may (but need not) be designed to be programmable. For example, one or more LERBs may include a programmable number of ring entries, number of ring stages, and/or associated functions. For example, a LERB can be reduced to hardware (e.g., as an ASIC, FPGA, DSP, special design core, RISC architecture such as an ARM® chip, etc.), and desired functions can be implemented using hardware and/or microcode. In embodiments with data pinning, pinning logic can be predetermined, programmable, or some combination thereof. In another example, a compositor with multiple LERBs can be implemented as a dynamic loadable library that can be loaded into an application, and the dynamic loadable library can have any number of configurable settings (e.g., a desired number of LERBs, number of stages, stage functions, pinning logic, metadata, update rates, etc.). In some embodiments, a application-specific LERB can be implemented, which may be programmable. In an example application for graphics rendering, the dynamic loadable library can provide configurable settings to allow a user to control interpolation type (e.g., off, linear, cubic, etc.), playback speed, metadata and the like. These and other applications are contemplated within the present disclosure.

As such, rendering computer graphics can be improved in various ways. Feeding user inputs into a compositor and running the compositor at a faster rate than the update loop for the game engine allows user input data to be consumed faster, so users can notice an improved system response in terms of both latency and smoothness. Further, by decoupling inputs from content generators, using interpolation to fill in gaps, and binding results to generate coupled outputs, techniques described herein facilitate power savings over prior techniques. Rendering can further be improved through the use of a logic executing ring buffer (LERB) that integrates logic into a ring buffer. More generally, the stage functions of the LERB enable a broad array of new capabilities and complex functionality not previously available with a traditional ring buffer. Some nonlimiting example functions include data pinning, data manipulation, communication through an API such as a GPU API, and others. LERBs can be implemented in any number of applications, such as graphics, audio, robotics, automation, financial trading, real-time data processing, and others. One or more LERBs, or an application-specific implementation thereof, may be designed with a pre-determined and/or programmable structure, predetermined and/or programmable logic, or some combination thereof. Using a LERB provides expanded functionality over conventional buffers, and facilitates more efficient memory management and data processing.

Exemplary Rendering Environment

Figure 2:
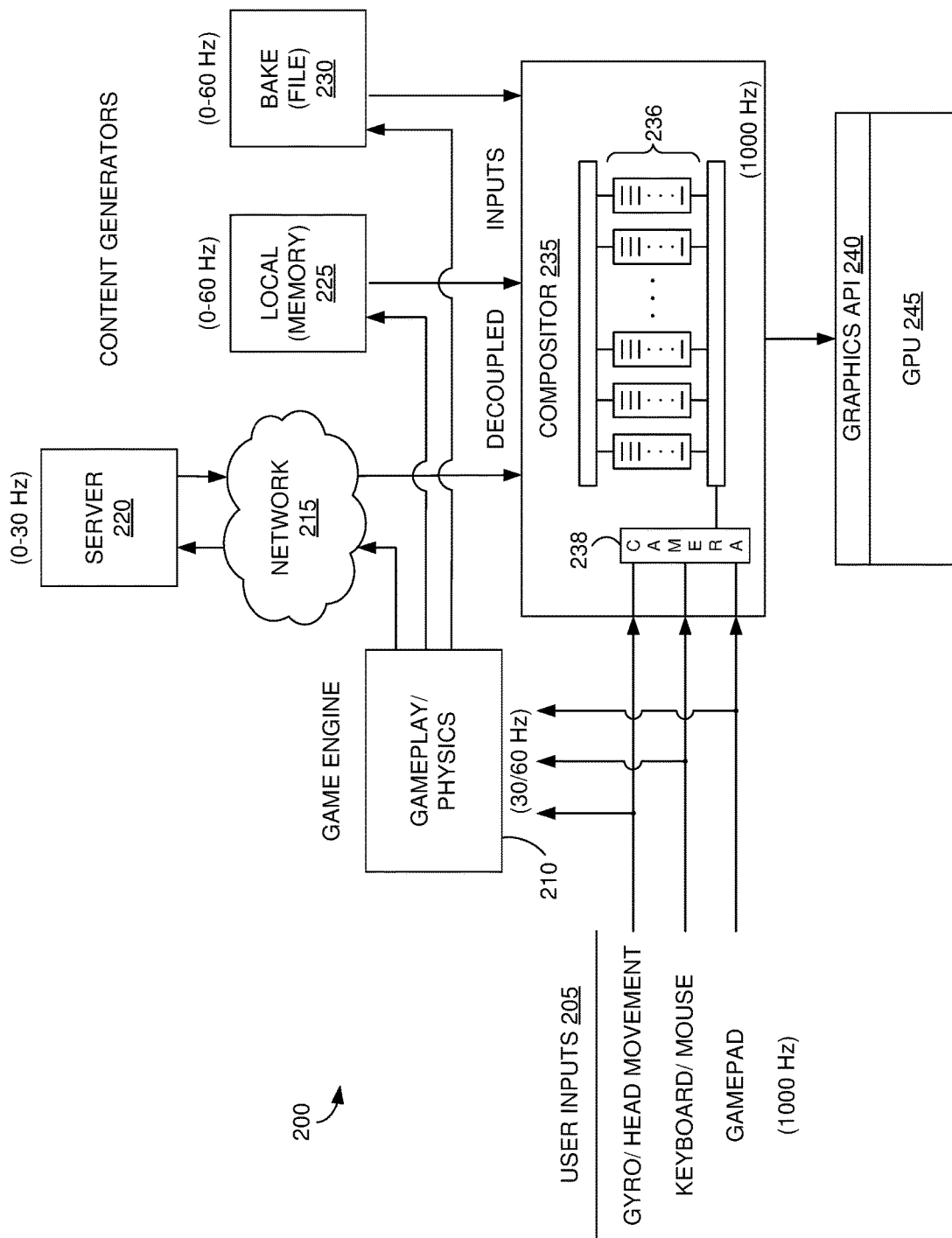
FIG. 2 is a block diagram of an example rendering system, in accordance with embodiments described herein.

Referring now to FIG. 2, a block diagram is shown of an example rendering system 200 suitable for use in implementing embodiments of the invention. Generally, rendering system 200 is suitable for rendering computer graphics or other animations, and, among other things, facilitates buffering or otherwise synchronizing decoupled inputs to generate coupled outputs. Components of rendering system 200 can be implemented using any kind of computing device capable of rendering computer graphics or other animations. For example, in an embodiment, components of rendering system 200 can operate on one or more computing devices such as computing device 1100, as described below with reference to FIG. 11. In embodiments, the computing device operating components of rendering system 200 can be a personal computer (PC), a gaming system, a mobile computing device, a PDA, a cell phone, a laptop computer, a workstation, a smart TV, or other suitable computing device. The components of rendering system 200 may communicate via network 215, which may include, without limitation, one or more local area networks (LANs) and/or wide area networks (WANs). Such networking environments are commonplace in offices, enterprise-wide computer networks, intranets, and the Internet.

Rendering system 200 includes game engine 210. As in prior systems, game engine 210 can accept various types of user inputs 205 from I/O components (e.g., a keyboard, mouse, gamepad, joystick, headset, sensors such as a gyro or accelerometer, etc.) and generate gameplay and physics updates. The gameplay and physics updates are provided to one or more content generators to inform the content generators what to generate. For example, one or more content generators may generate inputs for a 3D scene such as geometry and a texture for each 3D object, lighting, audio, and the like. Among other possible content generators, those depicted in FIG. 2 include server 220 (via network 215), local memory 225, and bake 230. By way nonlimiting example, assume game engine 210 moves a 3D object representing a vase. Game engine 210 can send a snapshot of the vase's position and/or orientation (e.g., represented using vectors and/or properties) to the content generators. Server 220, for example, can process the updated position of the vase to determine any updates to the geometry (e.g., if the vase breaks) and/or texture (e.g., because the lighting appearing on the vase may change based on the updated position/orientation). For each object, server 220, local memory 225, and/or bake 230 can contribute to a corresponding piece of data for the object (e.g., geometry, texture, etc.).

Rendering system 200 includes compositor 235. Generally, compositor 235 can be implemented as control hardware and/or logic for synchronizing the processing of decoupled inputs. In some embodiments, compositor 235 can be implemented using a collection of buffers 236 such that inputs to compositor 235 (whether data or handles, pointers, or other references to data) are loaded into a corresponding buffer 236. In one example embodiment for graphics rendering, compositor 235 can include buffers for each object in a scene (e.g., a geometry buffer and a texture buffer for each object). Additionally and/or alternatively, multiple pieces of data and/or data for multiple objects can be grouped together and sent into a buffer together. Such a configuration may be desirable in embodiments where resources are limited (e.g., in a hardware implementation). In some embodiments, compositor 235 can include a buffer for a cinematic camera. Compositor 235 may be configured to generate a 3D camera 238 from user inputs 205, in which case, the buffer for the cinematic camera may not be used. In some embodiments, one or more of buffers 236 can be implemented as a logic executing ring buffer (LERB). Compositor 235 may be configured to accept metadata relating to a particular input (e.g., indicating whether an object is hidden for a particular frame, some other modifier, etc.). The example illustrated in FIG. 2 is meant merely as an example. Other configurations for rendering computer graphics and other applications are contemplated within the present disclosure.

At a high level, compositor 235 can accept decoupled inputs from the content generators, interpolate to fill in any gaps, and bind the results to generate an output stream. Compositor 235 can accept inputs that are decoupled in space and/or time. More specifically, inputs from content generators can be decoupled in time (meaning inputs do not occur at the same rate or rates that are related by some multiple integer) and/or can be decoupled in space (meaning every update to geometry does not come with an updated texture). Even when some or all inputs run in threads, the compositor can run the inputs. Since compositor 235 can accept decoupled inputs, updates from the content generators can occur at any desired rate. In one nonlimiting example, server 220 may provide updates at any rate from 0-30 Hz, local memory may provide updates at any rate from 0-60 Hz, and bake may provide updates at any rate 0-60 Hz. Further, different pieces of data may update at different update rates. For example, lighting in a scene often does not change as quickly as movement of objects in the scene, so updates to lighting in a 3D scene need not occur as often as updates to geometry. Accordingly, artists and designers can specify which elements in a scene are most important to them. For example, an artist or designer can now specify that textures should update 10 times a second, while geometry should update 30 times a second. This provides artists and designers with more flexibility to eliminate unnecessary updates.

In some embodiments, user inputs 205 from an I/O component can be connected to compositor 235. By breaking out user inputs 205 from the conventional update loop and feeding user inputs into compositor 235, user inputs 205 can be used at a faster rate than in conventional rendering. By way of nonlimiting example, compositor 235 can operate at 1000 Hz, 2000 Hz, 5000 Hz, or some other speed. In the example illustrated in FIG. 2, compositor 235 updates at 1000 Hz. In this example, every millisecond, compositor 235 uses user inputs 205 to generate and/or update a 3D camera 238 (e.g., position and/or orientation for 3D camera 238) that reflects the view into the 3D scene to be rendered. 3D camera 238 can be generated at the same rate that compositor 235 draws to GPU 245, providing an updated 3D camera for each draw call. Accordingly, 3D camera 238 can be used to indicate the perspective from which to render a 3D scene. By feeding user inputs 205 into compositor 235 (which may be running at 1000 Hz) instead of through an update loop for 3D content (which may be running at 30/60 Hz), motion-to-photon latency is reduced when compared to prior techniques. Moreover, by generating and using 3D camera 238 at a faster rate than in prior techniques (1000 Hz in FIG. 2 vs. 30/60 Hz in prior techniques), the smoothness of the response is also improved. In some embodiments, 3D camera 238 can be generated to reflect where the user is expected to look at some time in the future (e.g., 1 ms from a sampled input, 5 ms from a sampled input, etc.) to compensate for expected latency. In this manner, 3D camera 238 can better reflect where a user is looking in the 3D scene.

Compositor 235 updates at a designated rate (e.g., 1000 Hz) to generate a coupled output stream from decoupled inputs. In some embodiments, compositor 235 uses a series of buffers 236 to synchronize the decoupled inputs. In an example embodiment, each input (e.g., geometry, texture, optional cinematic camera, audio, etc., or a corresponding handle, pointer, or other reference) can be fed into a corresponding buffer of compositor 235, and, for each compositor update, compositor 235 reads the latest data from each of the buffers, generates an output stream by binding together the latest data from, or otherwise associated with, each of the buffers (and optionally 3D camera 238), and draws the output stream to GPU 245 (e.g., using graphics API 240). As such, compositor 235 can drive the generation of a series of coherent images (frames) from decoupled inputs.

In some embodiments, compositor 235 can use interpolation to fill in gaps between updates. For example, an interpolation setting (e.g., off, linear, cubic, etc.), which may be predetermined or programmable, can instruct compositor 235 how to process data from a particular buffer. Additionally and/or alternatively, a playback speed setting, which may be predetermined or programmable, can instruct compositor 235 how fast to generate an output stream and/or draw to GPU 245. By way of nonlimiting example, if a previous data value in a prior buffer stage (e.g., a texture) was generated at time x, and a next data value in a current buffer stage was generated at time y, compositor 235 can elapse the data value by an amount of time equal to however much time elapsed from time x to time y, multiplied by playback speed (scaled from 0 to 1). Additionally and/or alternatively, as explained in more detail below, buffers 236 can be implemented as LERBs and/or the LERBs may use logic to pin data to a particular stage. In the event a LERB reads pinned data (e.g., a prior buffered value) instead of a current buffered value, compositor 235 can extrapolate to generate an updated data value. Any number of other predetermined and/or programmable settings for compositor 235 may be implemented, including settings that impact metadata and the like.

Logic Executing Ring Buffer—

In some embodiments, compositor 235 can be implemented using one or more logic-executing ring buffers (LERBs). Generally, a LERB is a ring buffer with integrated logic. Although embodiments are described herein based on a ring buffer, in some embodiments, another suitable buffer can be integrated with logic (e.g., a logic-executing circular linked list). Generally, the buffer has control logic, and one or more stages of the buffer have associated logic that executes in association with a buffer stage. The logic can be predetermined, programmable, or some combination thereof. In some embodiments, logic can be implemented to interpolate across buffer stages. Additionally and/or alternatively, logic can be implemented to pin data to a particular stage by performing some type of conditional test (e.g., evaluating whether data entering a buffer stage is valid, or satisfies some other criteria) and using the incoming data only if the conditional test is satisfied. As such, a LERB provides a flexible, self-managed buffer that can react differently to different data.

In a conventional ring buffer, incoming data gets stored in memory associated with the buffer. A conventional ring buffer may be implemented by storing persistent data in the buffer and using pointers to identify the first buffer stage in memory, the last buffer stage in memory, the beginning of valid data in memory, and the end of valid data in memory. When data is read, it is read from the beginning of the buffer. As data is received, it is stored at the end of the buffer. When the buffer is full, newly received data can replace the oldest data. When data is read or written, corresponding pointers are updated to indicate the current start or end stage.

Unlike a conventional ring buffer, a LERB includes a set of ring entries that can store persistent data and a set of logical ring stages that can store transient data, and each ring entry is mapped to a corresponding ring stage. Mappings between persistent data in/associated with ring entries and transient data in/associated with ring stages can be stored in or otherwise associated with an indirection table of handles, pointers, or some other reference. As the LERB advances, the position in memory of the persistent data does not change. Instead, transient data flows from ring stage to ring stage, and/or the mappings (e.g., pointers) identifying an associated ring entry for each ring stage can be updated. In this manner, persistent data stored or otherwise associated with a particular ring entry can logically advance through the ring stage without the underlying data actually moving.

Also unlike a conventional ring buffer, in a LERB, each of the mappings in the indirection table can be modified by an associated stage function that executes in association with a buffer stage. Each ring stage can have associated logic and functions, and the data stored or associated with the ring stage and/or an associated ring entry can be operated on at each ring stage as the buffer advances. Logic and functions can be predetermined, programmable, or some combination thereof.

A LERB can be implemented with parallel vectors or arrays. For example, transient data can be stored in a vector or array of pointers into an indirection table that maps a particular ring stage (e.g., a particular element of the ring stage vector/array) to a corresponding ring entry (e.g., a particular element of a ring entry vector/array). The ring entries (e.g., storing persistent data, or handles, pointers, or other references to persistent data) can be stored in their own vector or array. Further, the indirection table can be stored in a vector or array, with each mapping being stored in an element of the vector or array. In some embodiments, associated stage functions can be stored in the vector or array of ring stages. In other embodiments, associated stage functions can be stored in their own vector or array. Unlike a conventional ring buffer, the structure of a LERB allows for more complex functions than a simple FIFO queuing, such as data pinning.

In some embodiments data can be pinned to particular ring stage. More specifically, logic at a particular stage can evaluate whether or not to replace existing data (e.g., a particular buffered value) with incoming data (e.g., the next buffered value). This logic enables a LERB to determine whether to perform some action (e.g., update a ring stage for the buffer) based on some criteria (e.g., predetermined, programmable, etc.). In this manner, data can be pinned to a particular stage until the criteria is met (e.g., incoming data is valid, better than existing data, etc.).

Data pinning can be used in applications for video and/or audio streaming. Traditionally, when streaming audio or video using a buffer, if a packet from an input stream is dropped or corrupted, the audio or video stream stops playing, or plays with an error. By contrast, embodiments of the present technique can use data pinning such that bad data stored or otherwise associated with a particular stage is not used in the output stream. For example, control logic and/or an associated stage function may be configured to evaluate the bad data (e.g., by comparison to previous buffered data stored or otherwise associated with another ring stage), and if the data does not satisfy the selected criteria, the LERB can extrapolate an appropriate value (e.g., based on one or more previously buffered data values). In this manner, a video or audio stream can continue uninterrupted, even in the presence of dropped or corrupted input packets. In a 3D graphics example, assume a content generator fails, so a compositor (e.g., compositor 235) receives an invalid or empty texture. Without pinning, the invalid or empty texture would be stored in a buffer, and when the invalid or empty texture is read and drawn to the GPU, the output would produce a black frame or crash. With data pinning, if an invalid or empty piece of data comes in, instead of the LERB replacing prior valid data from a designated stage, the LERB can skip the update to that stage to retain the prior valid data.

In some embodiments, data pinning can be accomplished by control logic and/or a function associated with a particular ring stage. Logic can evaluate whether data entering the ring stage (or data identified by data entering the ring stage) is valid and/or whether or not this incoming data is better or worse than data currently associated with the ring stage. The evaluation can be based on any suitable criteria (e.g., time stamp, PSNR, etc.). If the criteria is met, the prior data can be pinned to the stage and/or an associated function can be triggered or modified. By way of nonlimiting example, a load function may be configured not to write invalid data, or not to load invalid data. In another example, a rendering stage may be configured not to update associated data (e.g., not to update an associated element in the indirection table). Additionally and/or alternatively, ring stages in the buffer may normally be configured to advance by updating associated mappings in the indirection table to identify the next piece of data in the buffer. In this example, if a rendering stage determines that the next piece of data is invalid or otherwise fails to satisfy the designated criteria (e.g., the next piece of data is an invalid or empty texture and the current piece of data is a valid texture), the associated mapping in the indirection table may not be updated. As such, the stages of the buffer can either advance, or not, depending on pinning logic associated with the stage.

Figure 3:
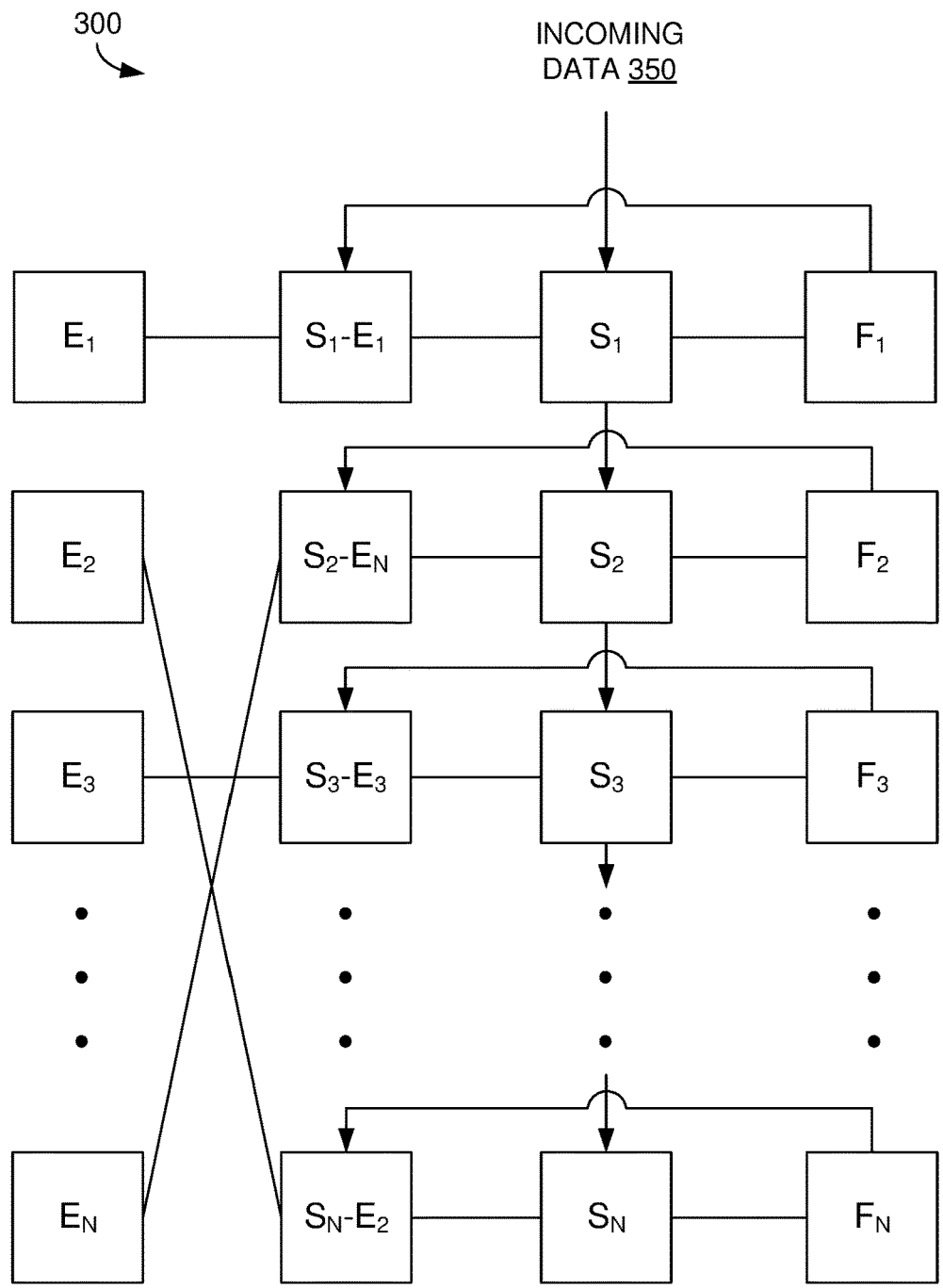
FIG. 3 is a block diagram of an example logic-executing ring buffer, in accordance with embodiments described herein.

Various architectures for a LERB may be discussed with reference to FIG. 3, which depicts an example LERB. Generally, a LERB may be implemented as a collection of arrays, vectors, or other suitable data structure. For example, in the embodiment illustrated in FIG. 3, LERB 300 includes four parallel arrays, including an array of ring entries 310, an array of elements of indirection table 320, an array of ring stages 330, and an array of ring stage functions 340. The size of the vectors/arrays (e.g., the number of ring entries/stages) may be predetermined and/or programmable. Generally, ring entries 310 can store persistent data and can be implemented using any desired vector/array structure, and may include metadata about data stored in an associated entry (e.g., timing metadata). Indirection table 320 can be implemented using a collection of adjustable mappings (e.g., pointers) that associate ring stages 330 to ring entries 310. Ring stages 330 are logical stages through which stored and/or associated data can advance. Ring stages 330 can be implemented using any desired vector/array structure, and may include metadata about data stored in or otherwise associated with a particular stage (e.g., timing metadata). For example, metadata can be attached to one or more associated ring entries 310 and/or ring stages 330. In one example relating to rendering computer graphics, metadata can include the time stamp of when the underlying data was generated and/or updated, an associated frame ID, interpolation parameters, and other data.

In some embodiments, ring entries 310 store persistent data for the LERB. Ring entries 310 can be hardware allocations to store data (e.g., memory for geometry, texture, etc.) or handlers, pointers, or some other reference to the data. In these embodiments, the hardware allocations never move. In other words, ring entries 310 do not get deleted or recreated, just reused. However, ring entries 310 can be reassigned to a different ring stage 330 using indirection. For example, there may be one ring entry assigned to each ring stage. While a ring entry can be logically assigned to different ring stages using indirection, the ring entry itself is persistent in memory. In some embodiments relating to rendering computer graphics, the persistent data can have an allocation (e.g., on the GPU) with memory of an appropriate size and format for data for a particular application (e.g., geometry, textures, handles, pointers, etc.) to get loaded into.

Ring entries 310 can be arranged in a vector or array of persistent data and associated metadata. Each vector/array element (ring entry) can hold a handle to an allocated data store, or it can actually hold the data store. In other words, a ring entry could be a hardware allocation for persistent storage or a handle, pointer, or other reference to the storage for the data that can be operated on. By way of nonlimiting example, a ring entry could be a 32-bit handle to a texture in persistent storage (e.g., on the GPU), or a ring entry could be real live data (the texture itself). Thus, each ring entry could store a matrix, an array, a picture, a blob, a handle, a pointer, some other reference, etc. In some embodiments where the underlying data is large, implementing ring entries as pointers improves memory management efficiency and reduces unnecessary operations by avoiding unnecessary movement of the data.

Ring stages 330 are logical stages through which data in (or associated with) the LERB advances during execution. Ring stages 330 hold the transient data of the LERB. As the buffer advances, transient data for a given stage gets passed to the next stage. Ring stages 330 can be implemented as a vector or array with elements storing data for a particular ring stage and associated metadata. For example, each vector or array element (ring stage) can hold or otherwise associate transient data, whether actual data in the form of an array, matrix, image, blob, etc., or some type of reference indicating the location of the actual data such as one or more handles, pointers, blob wrappers, or some other structure. Metadata can be attached to one or more associated ring stages 330. In one example relating to rendering computer graphics, metadata can include the time stamp of when the underlying data was generated and/or updated, an associated frame ID, interpolation parameters, and other data.

Each ring stage can be associated with a corresponding ring entry by way of indirection table 320. Persistent data stored in an associated ring entry is accessible using a mapping from indirection table 320 associated with a particular ring stage. For example, ring stage $S_1$ may store or otherwise associate transient data, and ring stage $S_1$ may be associated with an element in indirection table 320 that maps ring stage $S_1$ to ring entry $E_1$, which stores associated persistent data. Indirection table 320 may be implemented as a collection of adjustable mappings (e.g., handles, pointers, or some other references) that associate ring stages 330 to ring entries 310. The mappings can be stored in a vector/array, and each mapping can be one-to-one, one-to-many, or many-to-one. The mappings can be updated by one or more ring stage functions 340, by LERB control logic (e.g., to advance the buffer), or otherwise. For example, each mapping in the vector/array may be an adjustable handle, pointer, or other reference identifying an associated ring entry.

Ring stage functions 340 may be associated with ring stages 330, and logic of an associated stage function can execute in association with a particular ring stage. In some embodiments, ring stage functions 340 can be matched one to one with a corresponding ring stage 330, although this need not be the case. Ring stage functions 340 can be stored in the vector or array of ring stages 330, or in their own vector or array to facilitate loading functions separately from loading data. This latter embodiment improves modularity and usability of the underlying code. Generally, any number of LERB stages, and any associated function, can be used for any purpose. For example, a LERB and/or compositor may be used to buffer or otherwise synchronize processing multiple streams of data across space or time. Some example ring stage functions are described in greater detail herein. For example, ring stage functions 340 can be used to perform any type of function (e.g., loading data, processing data, teleporting data, etc.) in any application (e.g., rendering graphics, streaming audio, robotics, automation, financial trading, real-time data processing, artificial intelligence, etc.). For example, a LERB may be used to buffer or otherwise synchronize and/or interpolate decoupled inputs into an AI algorithm. Ring stage functions 340 may be predetermined, programmable, or some combination thereof.

Although example LERB 300 is described using a particular configuration of arrays with persistent data associated with ring entries 310 and transient data associated with ring stages 330, any suitable configuration is possible. Generally, transient data can be associated with a first array, vector, or other data structure (e.g., ring entries 310, ring stages 330, etc.), the transient data can map to persistent data associated with a second array, vector, or other data structure (e.g., ring entries 310, ring stages 330, etc.) via a third array, vector, or other data structure (e.g., indirection table 320), and ring functions (e.g., ring stage functions 340) can be associated with the first, second, and/or third data structures.

Additionally and/or alternatively, LERB 300 may include control logic that informs the LERB how to operate. Generally, the control logic can implement the ring buffer, for example, by determining how ring entries 310, indirection table 320, ring stage 330, and ring stage functions 340 interact, whether or not to pin data, what steps to take to advance the LERB, and the like. Any or all of the control logic can be implemented in one or more ring stage functions 340, and vice versa.

The operation of a logic executing ring buffer may be understood with respect to some example processes, including example processes for loading incoming data into a LERB, how to access data from a LERB, and how to advance a LERB.

Incoming Data into a LERB—

Each ring stage 330 can be designed to accept any type of data. In some embodiments, a LERB can receive transient data into a designated ring stage. For example, in the embodiment illustrated in FIG. 3, LERB 300 receives incoming data 350 into ring stage $S_1$. In some embodiments, transient data (e.g., a content update) can be locally allocated, and a handle, pointer, or other reference to the locally allocated data can be passed to the LERB. For example, server 220 might generate a blob and send it over network 215 to compositor 235 running on a client. The client can store a locally allocated copy of the blob (e.g., on a CPU of the client), generate a handle to the local allocated blob, and pass the handle to a corresponding LERB (e.g., in compositor 235). In embodiments that involve rendering with a GPU, an initial load stage for a LERB can be configured to load corresponding persistent data (e.g., by loading the blob, or a relevant portion thereof, to the GPU). In this example, incoming transient data (e.g., a handle to locally allocated data) can be passed to the load stage of a LERB for initial processing. In some embodiments, instead of passing a handle, pointer, or other reference to a locally allocated copy of incoming data, incoming data could be initially stored in persistent data, and a corresponding handle, pointer, or other reference to the persistent data can be passed into the LERB. In this and in other scenarios, there may be no need for a LERB stage to load incoming data to persistent storage. As such, using a load stage is optional, and other types of stage functions can be configured to read, operate on, or otherwise process incoming transient data.

The technique for passing transient data into the LERB may depend on its source. For example, in embodiments that involve rendering, when incoming data is received from a network location, the incoming data could be received into a component such as a buffer (e.g., to smooth out timing), and then the data (or a handle, pointer, or other reference to the data) can be passed into a corresponding LERB. If data is coming from disc (bake), the same or another buffer can read the data and pass the data (or a handle, pointer, or other reference to the data) into a corresponding LERB. If data is coming from local memory, a component can synthesize the data and pass the data (or a handle, pointer, or other reference to the data) into a corresponding LERB. These examples are merely for illustration purposes, and any suitable technique for passing transient data into a LERB may be implemented.

Accessing Data from a LERB—

At any given ring stage 330, an associated ring stage function 340 and/or LERB control logic can be programmed to access, read, process, or otherwise use transient data stored in or otherwise associated with a ring stage 330, and/or persistent data stored in or otherwise associated with a ring entry 310. For example, in embodiments with locally allocated data (e.g., on a CPU) where a handle to the locally allocated data is passed into the LERB at ring stage $S_1$, ring stage function $F_1$ can be programmed to use the handle to access and read the locally allocated data (e.g., a matrix, blob, etc.). For example, to read a blob, an associated ring stage function 340 might iterate over its blob entries to find a particular blob entry. For example, texture, geometry and cameras may all be stored in one blob, so a single pointer to the blob data can be passed to LERBs for texture, geometry and cameras. In this example, a corresponding ring stage function for each LERB can read the blob for the entries it cares about (e.g., a texture entry for the texture LERB, a geometry entry for the geometry LERB, etc.). In an example load stage, a load function (e.g., executing on a CPU) can use a received handle, pointer, or other reference (stored in the load stage) to access and read the locally allocated data, identify a desired piece of data, and upload it (e.g., to the GPU). Any number of other variations may be implemented. For example, incoming data 350 need not be a handle, pointer, or other reference to data, but rather, may be actual data, and a LERB can be designed to use any type of incoming data.

For any given ring stage 330, persistent data stored in an associated ring entry 310 can be accessed through indirection table 320. For example, transient data for a particular ring stage 330 (e.g., a handle, pointer or other reference to indirection table 320) may identify an element in indirection table 320, which itself may identify a corresponding ring entry 310. By way of nonlimiting example, transient data stored in or otherwise associated with a ring stage 330 may include a handle, pointer or other reference to an element of indirection table 320, which itself stores a handle, pointer or other reference to a corresponding ring entry 310. As such, a ring stage function 340 and/or LERB control logic can identify the location of persistent data stored in, or otherwise accessible via, a corresponding ring entry 310 for a particular ring stage 330, call the persistent data, and make use of the data.

Advancing a LERB—

Generally, control logic for a LERB, ring stage functions 340, or some combination thereof can determine whether to change indirection table 320 to change the association between ring stages 330 and ring entries 310. In other words, control logic and/or ring stage functions 340 can decide, for any given piece of data stored in or otherwise associated with a ring entry 310, whether that data advances to a subsequent ring stage 330 (e.g., by updating a handle, pointer, or other reference in indirection table 320 so the subsequent ring stage maps to the ring entry) or whether the data gets pinned (by advancing the buffer without changing a corresponding element in indirection table 320). For example, in the embodiment illustrated by FIG. 3, ring entry $E_2$ is mapped to ring stage $S_N$. When the LERB is ready to advance (e.g., at a designated update rate for the LERB), indirection table 320 can be updated so that the next ring stage $S_{N+1}$ (e.g., $S_1$) maps to $E_2$. Additionally and/or alternatively, pinning logic can determine not to update a corresponding element in indirection table 320. For example, when the LERB is ready to advance, a determination can be made for a designated ring stage (e.g., ring stage $S_3$) whether to maintain a current mapping to persistent data associated with the ring stage (e.g., data corresponding to ring stage $E_3$) or whether to update the mapping to associate persistent data currently mapped to a preceding ring stage (e.g., data corresponding to ring entry $E_N$ for ring stage $S_2$). Any type of criteria may be implemented to update indirection table 320 using predetermined and/or programmable logic.

As such, in these embodiments, ring entries 310 and/or their corresponding data are persistent, but by modifying indirection table 320 using control logic and/or logic from ring stage functions 340, the stage of the LERB can advance using predetermined and/or programmable criteria without physically changing the location of the persistent data.

Example Implementations—

Generally, a LERB can be implemented in software, hardware, or some combination thereof. For example, and as described above with respect to FIG. 3, a LERB can be implemented as a collection of vectors or arrays storing ring entries 310, indirection table 320, ring stages 330, and/or ring stage functions 340. In an example software implementation, a LERB (or a collection of LERBs, for example, in a compositor) can be packaged into a dynamic loadable library that can be loaded into an application or component thereof for execution. In an example application for graphics rendering, the dynamic loadable library can be loaded into UNREAL ENGINE®, UNITY®, a proprietary graphics compositor, or some other suitable component. The dynamic loadable library can have any number of configurable settings. Continuing with the example application for graphics rendering, the dynamic loadable library can provide configurable settings to allow a user to control or configure interpolation type (e.g., off, linear, cubic, etc.), playback speed, update rate, metadata, and the like. In embodiments involving multiple LERBs, the update rate for each LERB may be selectable (e.g., to enable the selection of different update rates for different inputs, such as geometry, texture, cameras, etc.). In this manner, a programmable LERB and/or compositor can be provided. In an example application of a programmable compositor, the dynamic loadable library can provide configurable settings to allow a user to configure a desired number of LERBs, update rates, number of stages, stage functions, pinning logic, metadata, some combination thereof, etc.

Additionally and/or alternatively, a compatible content generator (e.g., server 220, local memory 225, bake 230, etc.) could be packaged as a dynamic loadable library configured to generate content updates and communicate with a compatible compositor. For example, the dynamic loadable library for a content generator can provide configurable settings to allow a user to configure a desired function to generate content (e.g., geometry, textures, cameras, etc.) at selected rates to deliver decoupled inputs to a compatible compositor (e.g., with LERBs allocated to buffer or otherwise synchronize the inputs from the content generator), or some other component that provides an interface with the compositor.

Any variation of packaged content generators and/or packaged compositors may be implemented. For example, a packaged content generator could be used with a packaged compositor and connected to a game play server. In another example, a content provider could develop its own content generator and game play server and use a packaged compositor. In another example, a game developer can use a packaged content generator to generate content, and a separately developed headset can use a packaged compositor to render the content. These examples are meant as examples, and any other variations may be implemented.

In some embodiments, a LERB can be reduced to hardware (e.g., as an ASIC, FPGA, DSP, special design core, RISC architecture such as an ARM® chip, etc.). For example, one or more LERBs can be implemented as a physical unit using a plurality of synchronized buffers. Actions such as buffer rotations and corresponding data manipulations can be reduced to hardware. Updates can be triggered off a received and/or generated signal (e.g., a clock signal, control signal, etc.), when the LERB receives incoming data, and/or based on some other event. Desired functions can be implemented using hardware and/or microcode. For example, a hardware-implemented LERB may use an executor to run microcode that modifies FIFO logic to facilitate pinning. Indirection tables, pinning logic, and/or other functions can be predetermined, programmable, or some combination thereof. In this manner, a LERB enable complex operations currently unavailable with existing hardware-implemented buffers. For example, pinning is a relatively complex operation in which data advancing through a buffer can selectively skip a particular buffer stage. Conventional hardware-implemented FIFO buffers do not have this capability. As such, a hardware-implemented LERB provides expanded functionality and improved flexibility over existing hardware-implemented buffers.

Additionally and/or alternatively, ring stages can be implemented as hardware registers. For example, a hardware-implemented LERB can include an executor, hardware registers reflecting the state of the buffer (e.g., ring stages and ring entries), and hardware registers used by the executor to compute stage logic and execute stage functions (whether programmable, predetermined, a combination, or otherwise). By way of nonlimiting example, a LERB may be implemented using two interconnected blocks of registers, for example, one for the buffer state and one for logic and stage functions. By selecting instructions for the hardware-implemented LERB that are tailored to a particular application and omitting instructions that will not be needed for functions of the application, power demands for the LERB can be reduced.

Figure 4:
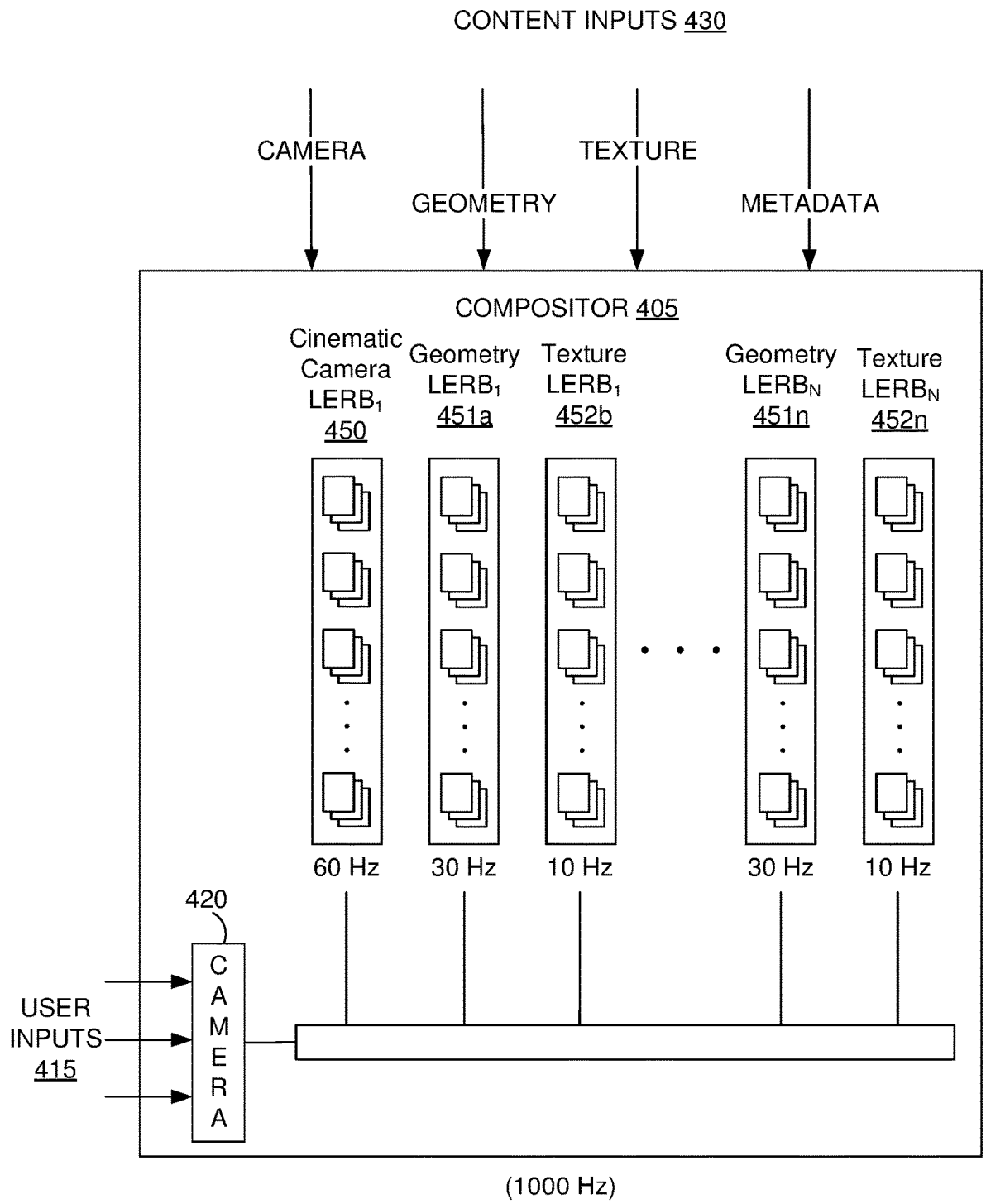
FIG. 4 is a block diagram of an example compositor configured for use in rendering computer graphics, in accordance with embodiments described herein.

Turning now to FIG. 4, FIG. 4 depicts a block diagram of an example compositor configured for use in rendering computer graphics, in accordance with embodiments described herein. In the embodiment illustrated in FIG. 4, compositor 405 accepts user inputs 415 from an I/O component and content inputs 430 (which may be data or handles, pointers, or other references to the data). Content inputs 430 (e.g., cinematic camera, geometry, texture, metadata, etc.) can be decoupled in space and/or time. In this example, compositor 405 buffers or otherwise synchronizes content inputs 430 using corresponding LERBs 450, 451*a* . . . 451*n*, 452*b* . . . 452*n*. Each LERB can update at a different rate. By way of nonlimiting example, geometry LERBs 451*a* . . . 451*n* can update at 30 Hz, texture LERBs 452*b* . . . 452*n* can update at 10 Hz, and cinematic camera LERB 450 can update at 60 Hz. At each LERB tick, the LERB can advance (e.g., by executing control logic and/or designated ring stage functions) at its own rate. Generally, compositor 405 (e.g., via its LERBs) accesses buffered data associated with a particular ring stage (e.g., data associated with an interpolation stage, a draw stage, etc.). In some embodiments, compositor 405 may access multiple buffered data values for a particular LERB, for example, to determine whether or not to pin a particular buffered data value to a designated stage, to interpolate between multiple buffered data values, or extrapolate from buffered data values. As such, compositor 405 can generate interpolated/extrapolated data (or otherwise trigger its generation), and/or draw the resulting data and updated 3D camera 420 to a GPU to generate a frame.

Generally, compositor 405 can operate on a loop (e.g., 1000 Hz). At each compositor tick, compositor 405 may receive updated user inputs 415 (e.g., reflecting an updated orientation of a VR headset) and generate an updated 3D camera 420 to reflect the updated input (e.g., the new head position). In some embodiments, one or more ring stage functions may execute in association with the compositor loop, instead of or in addition to executing in association with a corresponding LERB loop. For example, each LERB may advance at its own rate (e.g., only during a LERB update, passing transient data between ring stages and updating the indirection table), while one or more ring functions can be triggered by the compositor during a compositor loop (e.g., executing during every iteration of a compositor loop). In some embodiments, a compositor tick may trigger a LERB update (e.g., one of every hundred 1000 Hz compositor updates may trigger a 10 Hz texture LERB update). In this example, any or all of the stage functions associated with the triggered LERB may execute, and the LERB can be advanced. In some embodiments, some stage functions (e.g., loading data to the GPU) may execute during a LERB update, while other stage functions (e.g., draw to the GPU) may execute during a compositor loop. By way of nonlimiting example, at each compositor tick, compositor 405 may access buffered data from a designated stage for some or all of its LERBs (e.g., data associated with a draw stage), and execute an associated global stage function (e.g., issue a draw call to the graphics API to draw content updates for each of the LERBs to the GPU using updated 3D camera 420). Any ring stage may be designated for use during each iteration of the compositor loop, only while advancing a LERB, or some combination thereof.

In some embodiments, one or more LERBs of compositor 405 can perform (or otherwise trigger) interpolation. Interpolation may be performed for each content update (e.g., geometry and texture for each object in a 3D scene, lighting, audio, etc.). In one example, an interpolation stage of a LERB may be configured to interpolate data associated with multiple ring stages of the LERB (e.g., consecutive content updates). Depending on an interpolation setting, different interpolation functions can be applied (e.g., linear interpolation may use two buffered data values, cubic interpolation may use four buffered data values, etc.). In applications involving graphics rendering, interpolation can be performed on a CPU, a GPU, or some combination thereof. In one example implementation using both a CPU and a GPU, a CPU running a LERB can transmit to the GPU handles, pointers, or some other references identifying the locations of the data to process, and the GPU can perform the interpolation. Any other variation for allocating operations between a CPU and GPU may be implemented.

In some embodiments, one or more LERBs of compositor 405 can draw to a GPU. For example, compositor 405 and/or its LERBs can identify data associated with corresponding draw stages, bind the data together with updated 3D camera 420 or an updated cinematic camera generated from cinematic camera LERB 450, and may optimize an output stream for the GPU. For example, a draw stage may be configured to cull away portions of data that the GPU does not need to render a scene. As such, the GPU can use the optimized data for each object to render a frame depicting the current state of the 3D world from the location and orientation of the user in the world (or the cinematic camera), interpolated to better reflect the current moment in time, user position and/or camera view. An example implementation of a LERB configured use in rendering computer graphics is described more detail below with respect to FIG. 5.

Compositor 405 may be implemented to enable any number of compositor controls. For example, compositor 405 may support global playback changes (e.g., implemented across all LERBs in compositor 405), such as pausing, rewinding, changed playback speed, and the like. For example, an input for playback speed can be used to speed up or slow down compositor updates. In this scenario, the update rate for each LERB in compositor 405 can be proportionally adjusted such that the update rates for all of the LERBs maintain their matching with respect to each other. Additionally and/or alternatively, various settings may be provided as inputs to compositor 405. In some examples, a setting or corresponding scale value can be provided as an input to a ring stage function and/or control logic (e.g., an interpolation setting may impact a value in an interpolation equation). Further, a ring stage function can accept a setting or corresponding value as an input so the function acts differently in response to different settings.

In some embodiments, changes to settings can occur at runtime. For example, compositor 405 can accept a runtime input that changes the behavior of compositor 405 at runtime. More specifically, a user input (e.g., a particular keyboard input) can be designated to switch an interpolation setting (e.g., from linear to cubic). In this case, receiving the designated keyboard input at runtime can trigger a runtime change to the way in which the interpolation function operates (e.g., instead of interpolating between values associated with two ring stage, ring stage functions for four ring stages may be turned on to implement cubic interpolation). Compositor 405 (and more generally, one or more LERBs) may be configured to implement runtime changes to any desired setting (e.g., playback speed, interpolation setting, etc.)

Compositor 405 (and more generally, one or more LERBs) may be executed using any allocation between resources of a CPU and resources of a GPU. For example, compositor 405 may operate inside a CPU, a GPU, a driver, another suitable component, or some combination thereof. For example, in some embodiments, an update for a vertex buffer may include millions of vertices. Interpolating between multiple updates can involve walking those millions of vertices to compute the interpolation. In some embodiments, since the GPU will read the vertices in order to draw them, allocating interpolation computations to the GPU (e.g., so the GPU interpolates while reading the data) improves efficiency in the rendering process. Although various example allocations between a CPU and GPU are described, any suitable allocation is possible. In one example allocation between a CPU and GPU, compositor 405 (and more generally, one or more LERBs) may be executed on a CPU. The CPU (e.g., compositor 405) can send texture or geometry handles and an interpolation factor to the GPU. The GPU can use the handles and interpolation factor to identify buffered data values and perform the interpolation. In this scenario, the LERB executes on the CPU, its ring entries contain handles to data stored on the GPU, and its ring functions pass commands and handles to the GPU.

In some embodiments, compositor 405 (and more generally, one or more LERBs) can drive multiple GPUs. For example, in embodiments which render with a plurality of GPUs, a single compositor can drive them all. In one example involving rendering per eye for each of two eyes, compositor 405 can be used to multiplex outputs to two GPUs, one for each eye. In another example involving checkerboard rendering, compositor 405 can be used to multiplex outputs to any number of GPUs (e.g., 16 GPUs), and a ring stage may be configured to combine (or trigger combining) the results of each of the GPU outputs. In some embodiments, each object may be rendered separately and then the results combined. Further, each GPU may operate independently of the other GPUs. Continuing with the example above with 16 GPUs, each of the GPUs can be assigned to generate textures and geometry at any rate. Since compositor 405 can process decoupled inputs, in some embodiments, compositor 405 can assign processing different inputs (e.g., groups of inputs) to different GPUs, such that the GPUs can produce work without dependencies upon the other GPUs. This type of configuration facilitates efficient scaling.

In another example, compositor 405 can operate within a GPU or other processor. In this scenario, compositor 405 can be implemented in various ways. For example, an ASIC, FPGA, DSP, special design core, a reduced instruction set computing (RISC) architecture such as an ARM® chip (e.g., transistors of an ARM core), or other suitable architecture could reside inside the GPU and run the compositor. The implementation can impact the degree of programmability. For example, some implementations (e.g., an ARM core) may provide substantially unlimited programmability of LERB stages (e.g., number of stages, associated logic, applicable functions, etc.). Some implementations such as a DSP may provide a predetermined set of programmable configurations to choose from. As such, the configuration of a LERB can be predetermined, programmable, or some combination.

Figure 5:
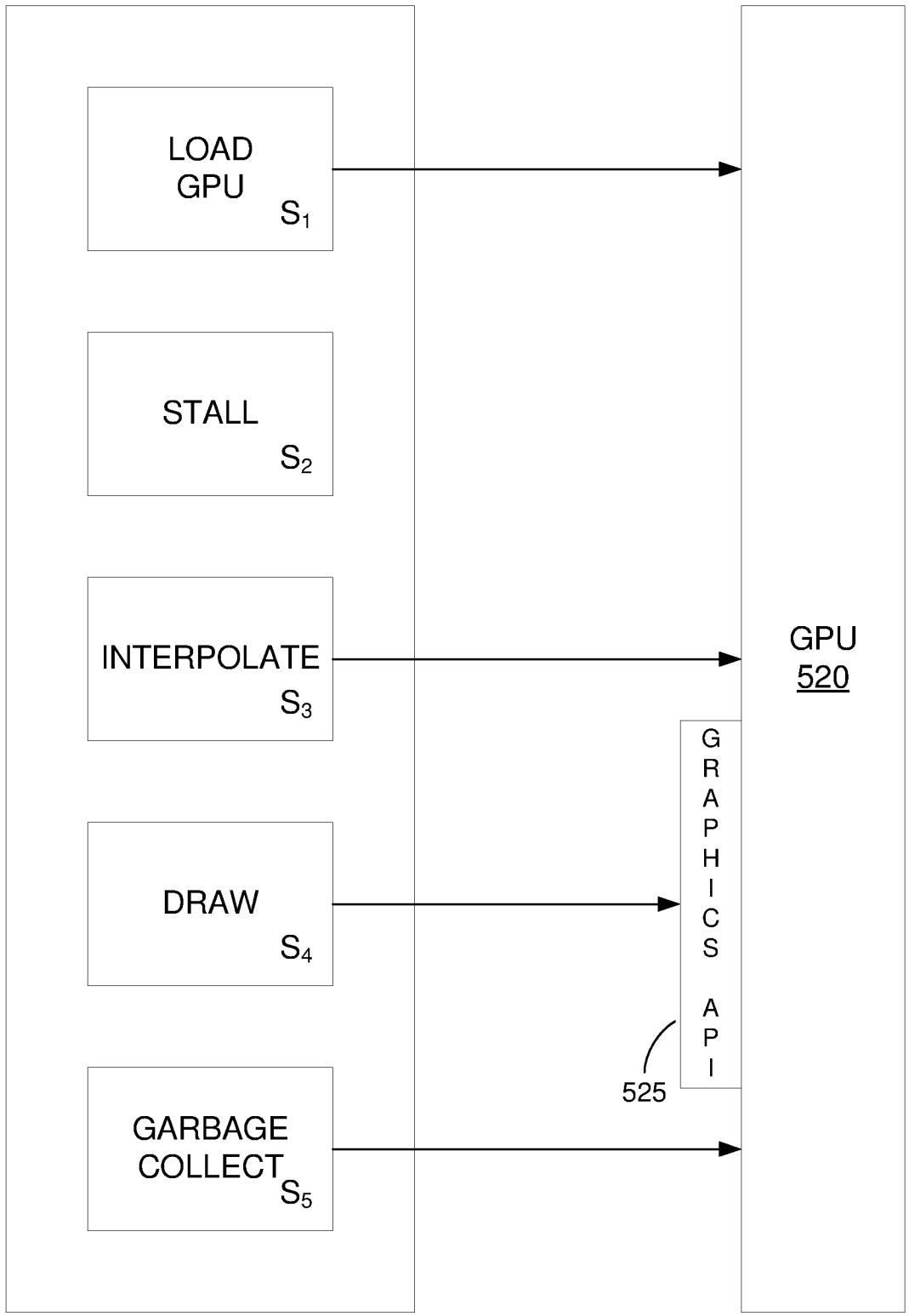
FIG. 5 is a block diagram of an example logic-executing ring buffer configured for use in rendering computer graphics, in accordance with embodiments described herein.

FIG. 5 is a block diagram of an example LERB configured for use in rendering computer graphics, in accordance with embodiments described herein. More specifically, LERB 510 may be implemented on a GPU to facilitate rendering with GPU 520. LERB 510 will be described as a buffer for geometry updates for illustrative purposes. In the illustrated in FIG. 5, LERB 510 includes five stages: load GPU ($S_1$), stall ($S_2$), interpolation ($S_3$), draw ($S_4$), and garbage collect ($S_5$). This configuration is merely meant as an example, and any number of other stage configurations can be implemented.

In an example load stage, a geometry update is received by a CPU, a locally allocated copy is stored, and a handle, pointer, or other reference to the locally allocated copy is passed to load GPU stage $S_1$. An associated ring stage function executes, uses the handle (for example) to access the updated geometry, and evaluates whether the updated geometry is valid. If it is, load GPU stage $S_1$ opens a side channel to the GPU (or the GPU opens up a connection to the CPU, etc.) to transfer the updated geometry to GPU memory. As such, load GPU stage $S_1$ can be configured to stream updated data to the GPU, or allow the GPU to pull the updated data from the CPU. A handle, pointer, or other reference to the location of the updated geometry in GPU memory can be stored in an associated ring entry for load GPU stage $S_1$, and LERB 510 may be advanced. For example, the associated ring entry can be advanced to the next ring stage (stall stage $S_1$), and a ring entry associated with the last ring stage (e.g., garbage collect stage $S_5$) can be advanced to the load GPU stage $S_1$. As such, load GPU stage $S_1$ can write over the last ring entry with the next updated geometry. Note that a load GPU stage need not exist. For example, in embodiments where a LERB exists solely on the CPU, performs all its processing on the CPU, and never loads anything to a GPU.

In some embodiments, a delay may be built into a LERB for various purposes. For example, a delay may be added to allow time for a piece of data to load and/or become resident before using it in a subsequent stage. In the example illustrated in FIG. 5, stall stage $S_2$ provides time (one LERB tick) for the prior stage to complete (e.g. for the geometry update to load to the GPU). As such, LERB 510 may be configured to advance to the next stage (i.e., update the indirection table to map the location of the updated geometry in GPU memory to the next ring stage without performing any other function). A stall may be implemented for any purpose. In some embodiments, a ring stage (whether part of, or separate from stall stage $S_2$) can be implemented to verify that data loaded during a prior stage has been successfully loaded.

In an example implementation of interpolation, interpolate stage $S_3$ can be configured to evaluate the updated geometry using pinning. For example, the updated geometry entering the interpolate stage $S_3$ can be evaluated for validity, compared with the previous geometry update (e.g., the current data entering draw stage $S_4$), or evaluated using some other criteria. If the updated geometry does not satisfy the designated criteria, interpolate stage $S_3$ can be configured to pin the previous data to the stage (e.g., by not updating the indirection table). If the updated geometry satisfies the designated criteria, interpolate stage $S_3$ can designate the updated geometry as the previous value in the interpolation function, compute a corresponding portion of an interpolation function (e.g., while draw stage $S_4$ computes/triggers computation of the portion of the interpolation function for the current value associated with draw stage $S_4$), and update the indirection table to map interpolate stage $S_3$ to the location of the updated geometry in GPU memory. As such, a previous value (e.g., associated with interpolate stage $S_3$) and a current value (e.g., associated with draw stage $S_4$) can be combined to perform the interpolation.

Interpolation can be performed in various ways. For example, if a previously received data value (e.g., a geometry update) associated with a subsequent buffer stage was generated at time x, and a subsequently received data value associated with a preceding buffer stage was generated at time y, the CPU/GPU can elapse the data value by an amount of time equal to however much time elapsed from time x to time y, multiplied by playback speed (scaled from 0 to 1). In the event of network latency, dropped packets, or other scenario, the LERB can use pinned data to determine an appropriate LERB output. In this scenario, the interpolate stage $S_3$ can be modified to implement an extrapolation function. For example, instead of interpolating between a current value (associated with stage $S_3$) and a previous value (associated with stage $S_4$), an extrapolated value can be generated based on previous values (e.g., associated with stages $S_4$ and $S_5$). In some embodiments, logic (e.g., in stage $S_3$) can be implemented to compensate for jitter associated with extrapolation. This configuration is meant simply as an example, and other techniques for interpolating/extrapolating may be implemented.

In examples involving a CPU and a GPU, any suitable communication scheme between the CPU and GPU can be implemented to perform the interpolation and/or draw to the GPU. For example, a compositor (e.g., running on a CPU) can provide a command or other indication to the GPU to bind handles for previous and current values, identify them as previous and current, and assign a particular interpolation factor. Additionally and/or alternatively, commands may be implemented using an API of the GPU (e.g., draw API 525), by writing assembly code on the GPU, or otherwise. Any suitable interface between the compositor (CPU) and GPU can be implemented. As such, LERB 510 and GPU can communicate to facilitate performing interpolate stage $S_3$ and/or draw stage $S_4$. Finally, a garbage collect stage $S_5$ can be configured to perform memory management on data associated with the stage and/or with the associated ring entry. For example, garbage collect stage $S_5$ can be configured to make unresident any associated data on the GPU. These and other variations will be understood by those of ordinary skill in the art.

Exemplary Flow Diagrams

Figure 7:
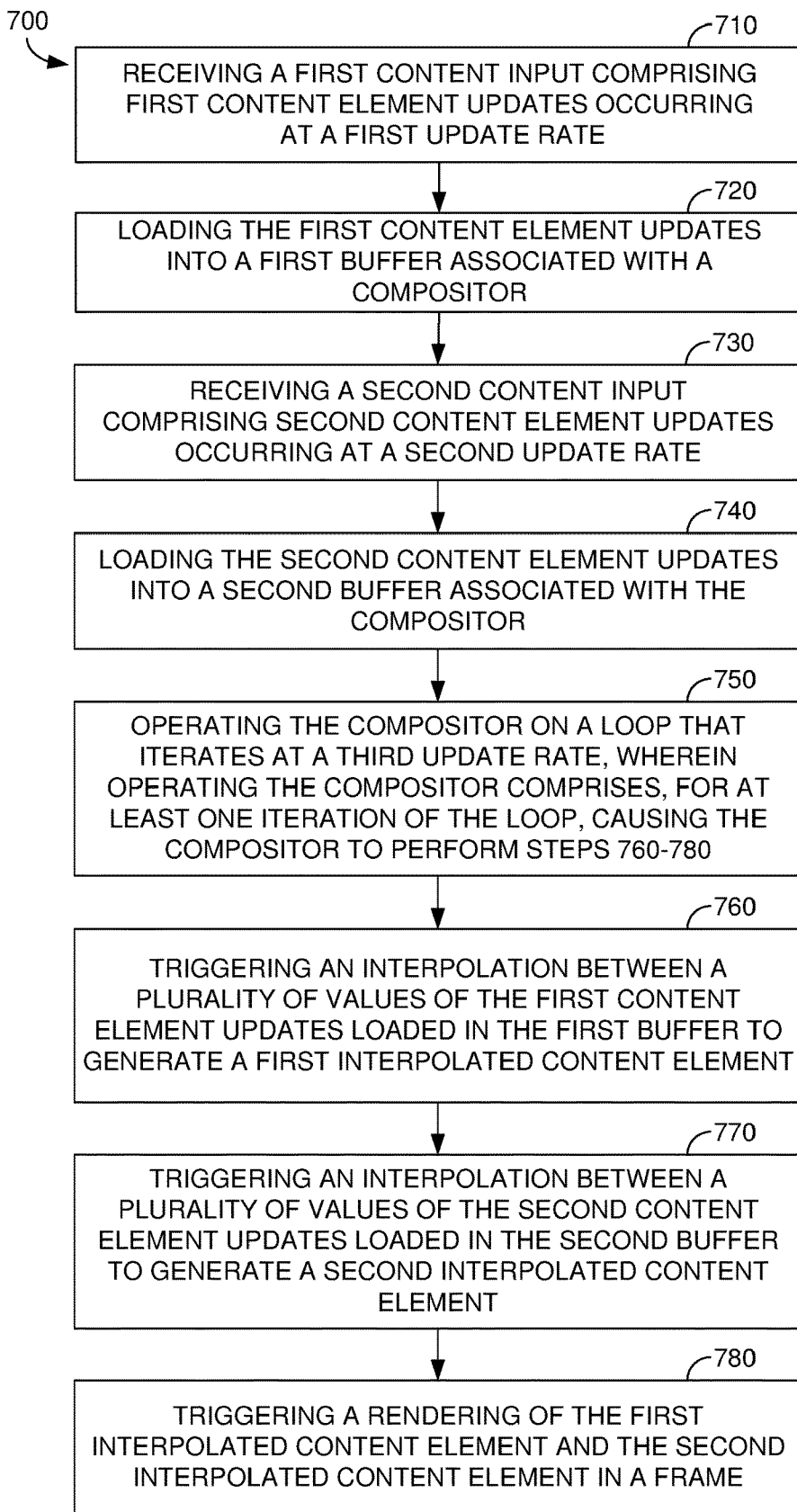
FIG. 7 is a flow diagram showing another example method for rendering graphics with a compositor, in accordance with embodiments described herein.
Figure 8:
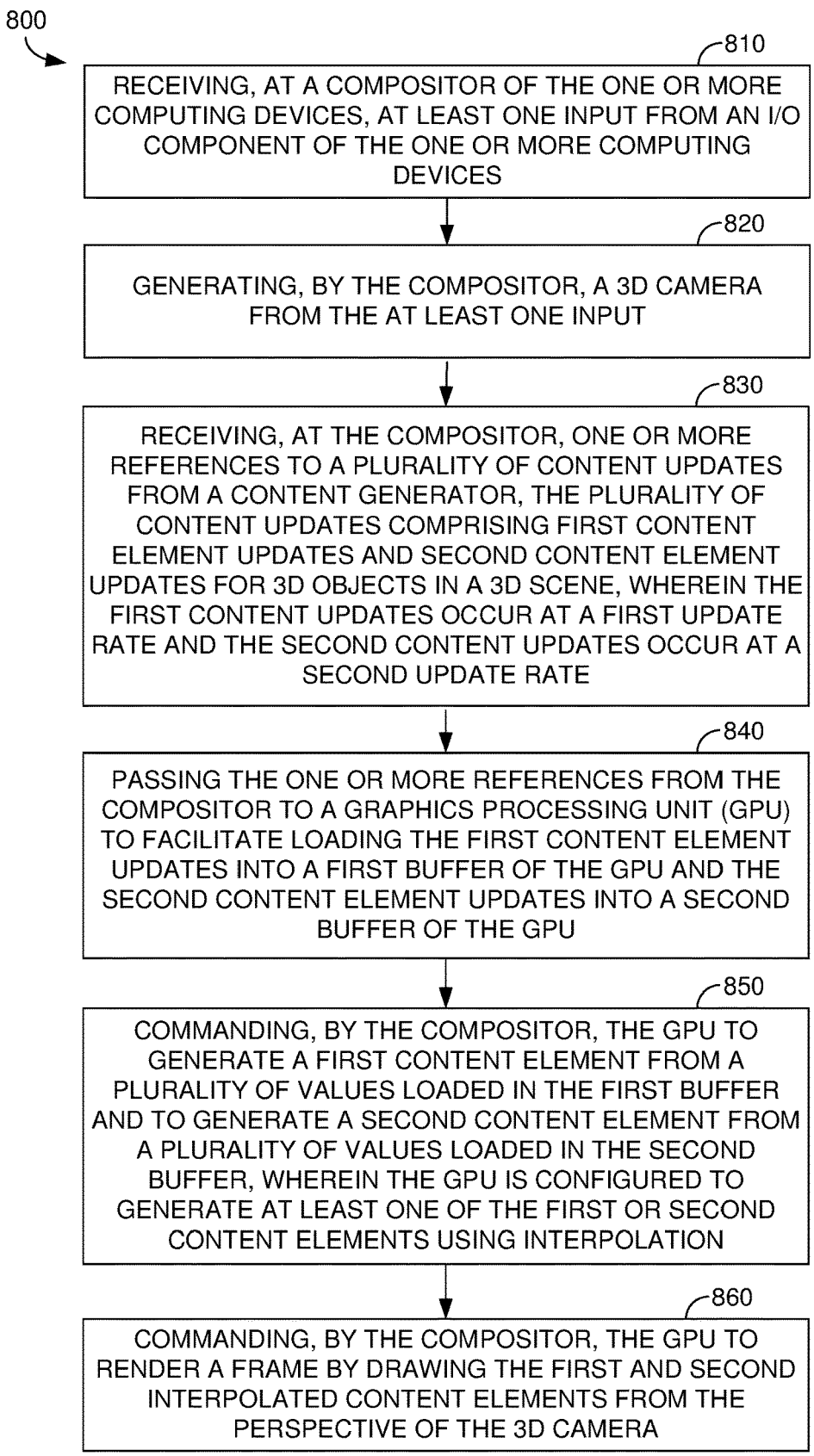
FIG. 8 is a flow diagram showing another example method for rendering graphics with a compositor, in accordance with embodiments described herein.
Figure 9:
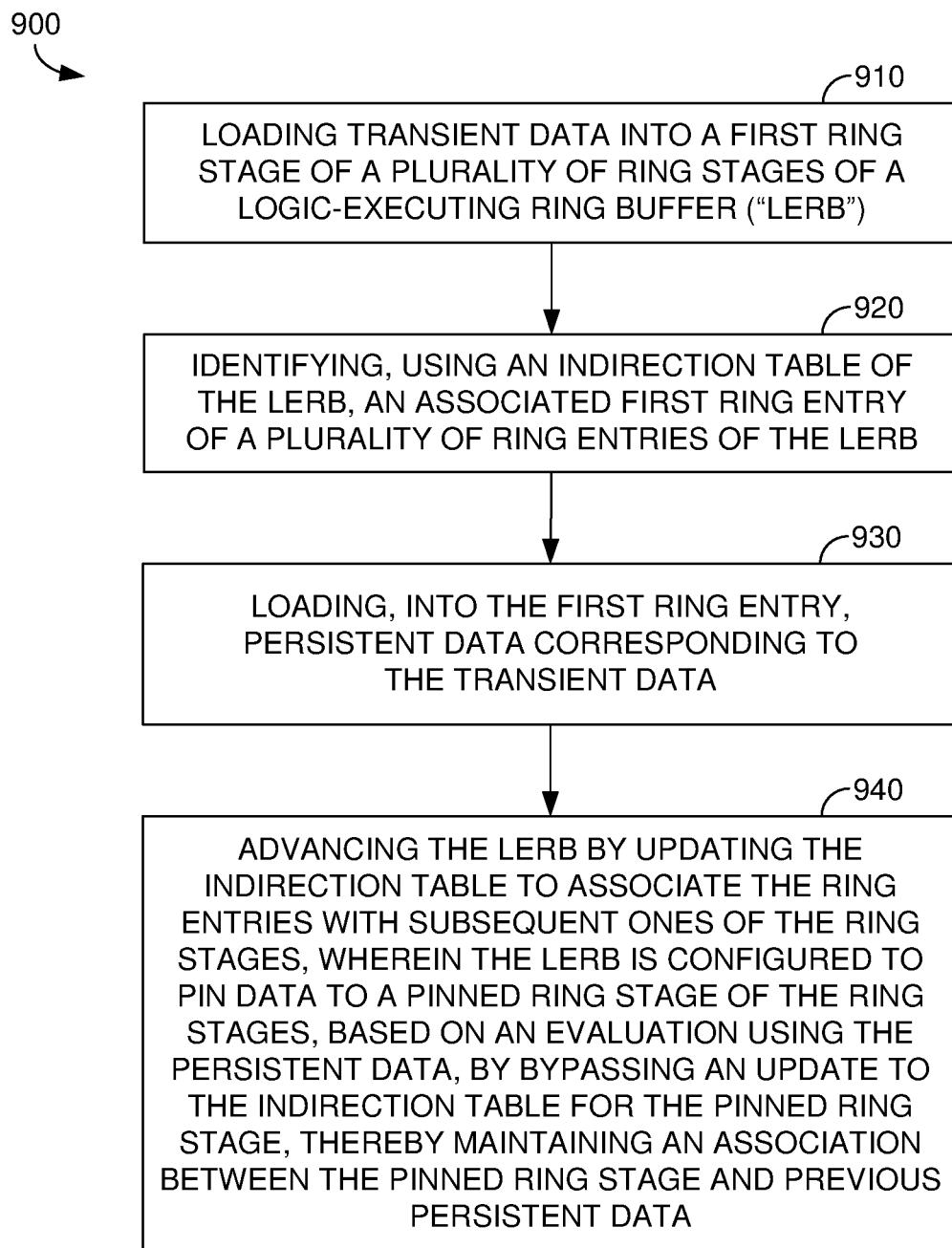
FIG. 9 is a flow diagram showing an example method for operating a logic-executing ring buffer with data pinning, in accordance with embodiments described herein.
Figure 10:
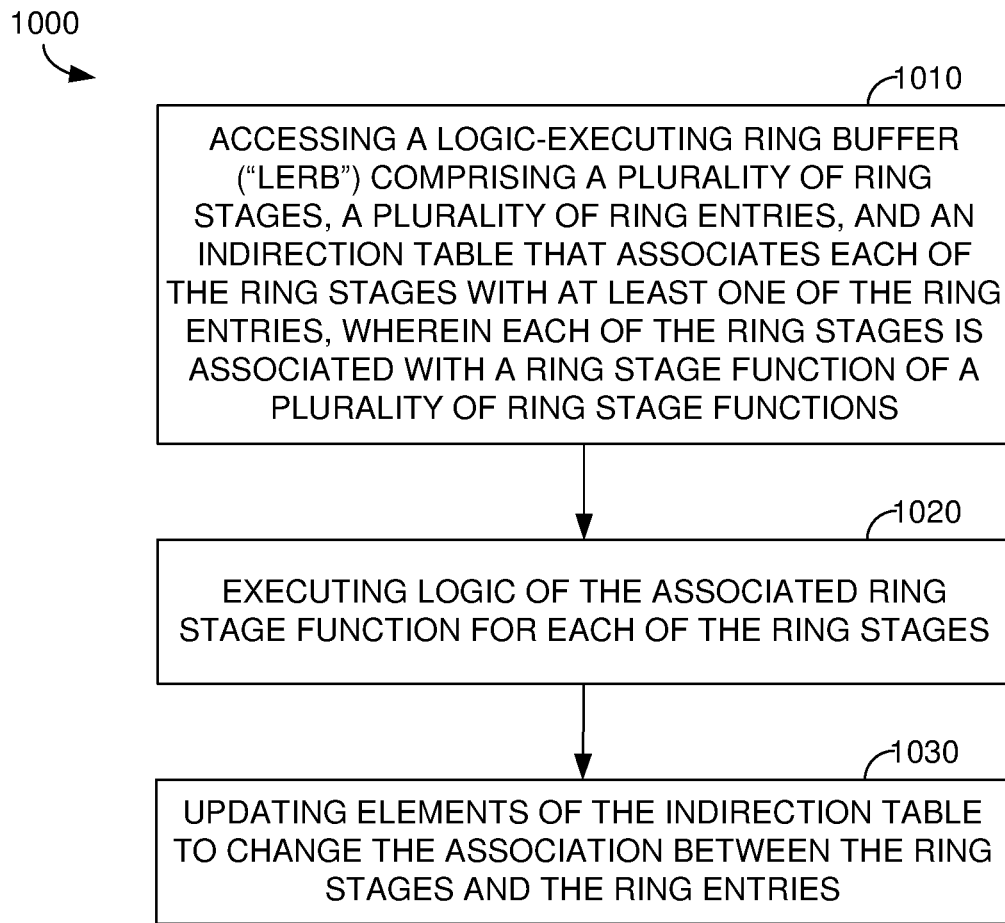
FIG. 10 is a flow diagram showing another example method for operating a logic-executing ring buffer, in accordance with embodiments described herein.

With reference to FIGS. 6-10, flow diagrams are provided illustrating methods for rendering graphics with a compositor (FIGS. 6-8) and for operating a LERB (FIGS. 9-10). The methods can be performed using the techniques or components described herein, such as the rendering system described herein. For example, in some embodiments, one or more computer storage media having computer-executable instructions embodied thereon can, when executed by one or more processors, cause the one or more processors to perform the methods within the rendering system described herein.

Figure 6:
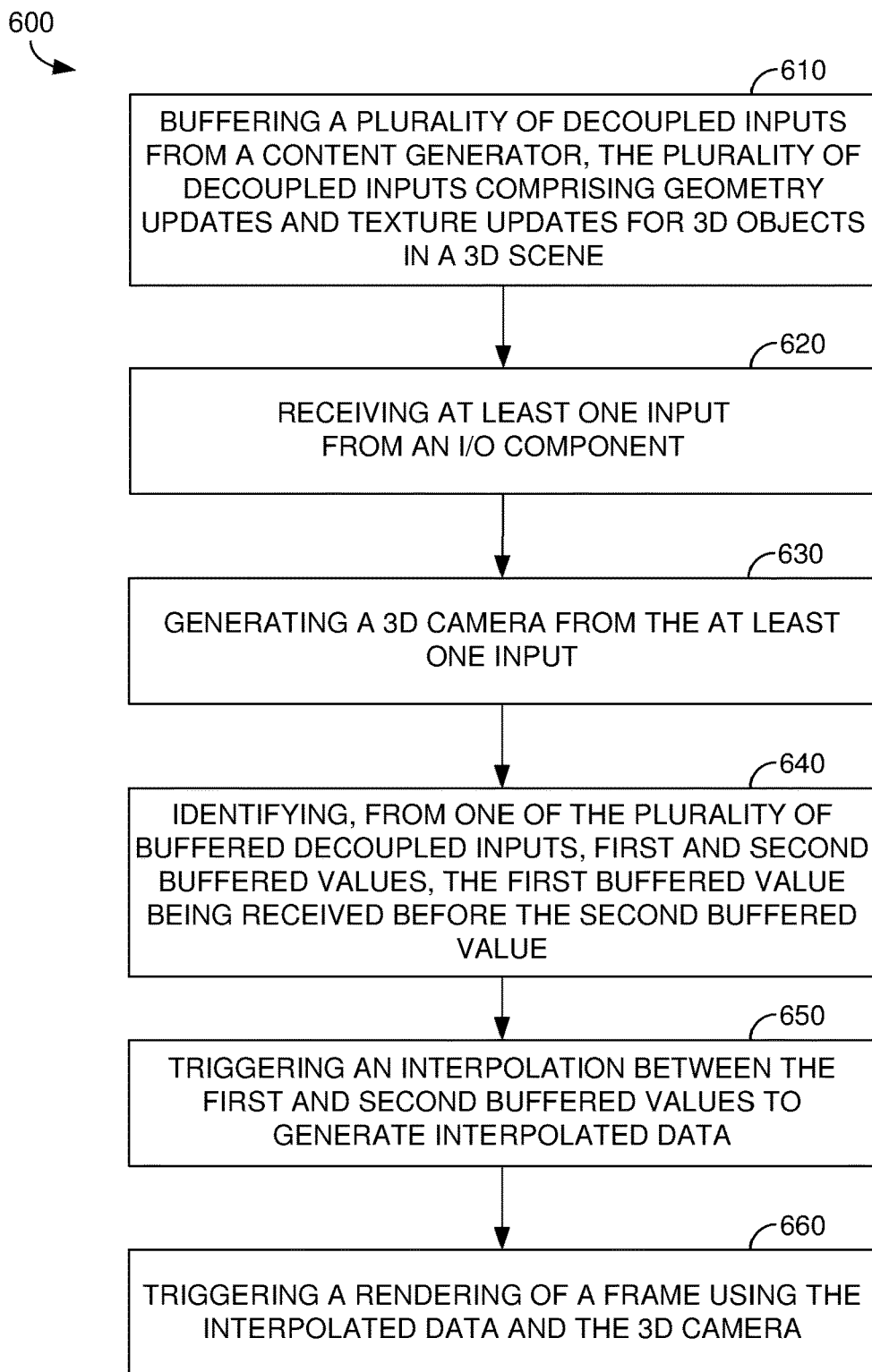
FIG. 6 is a flow diagram showing an example method for rendering graphics with a compositor, in accordance with embodiments described herein.

Turning now to FIG. 6, a flow diagram is provided that illustrates a method 600 for rendering graphics with a compositor. Initially at block 610, a plurality of decoupled inputs from a content generator are buffered. The plurality of decoupled inputs comprise geometry updates and texture updates for 3D objects in a 3D scene. At block 620, at least one input is received from an I/O component. At block 630, a 3D camera is generated from the at least one input. At block 640, first and second buffered values are identified from one of the plurality of buffered decoupled inputs. The first buffered value was received before the second buffered value. At block 650, an interpolation is triggered between the first and second buffered values to generate interpolated data. At block 660, a rendering of a frame is triggered using the interpolated data and the 3D camera.

Turning now to FIG. 7, a flow diagram is provided that illustrates a method 700 for rendering graphics with a compositor. Initially at block 710, a first content input comprising first content element updates occurring at a first update rate is received. At block 720, the first content element updates are loaded into a first buffer associated with a compositor. At block 730, a second content input comprising second content element updates occurring at a second update rate is received. At block 740, the second content element updates are loaded into a second buffer associated with the compositor. At block 750, the compositor is operated on a loop that iterates at a third update rate. Operating the compositor comprises, for at least one iteration of the loop, causing the compositor to perform steps 760-780. At block 760, an interpolation is triggered between a plurality of values of the first content element updates loaded in the first buffer to generate a first interpolated content element. At block 770, an interpolation is triggered between a plurality of values of the second content element updates loaded in the second buffer to generate a second interpolated content element. At block 780, a rendering of the first interpolated content element and the second interpolated content element in a frame is triggered.

Turning now to FIG. 8, a flow diagram is provided that illustrates a method 800 for rendering graphics with a compositor. Initially at block 810, at least one input from an I/O component of one or more computing devices is received at a compositor of the one or more computing devices. At block 820, a 3D camera is generated by the compositor from the at least one input. At block 830, one or more references to a plurality of content updates are received at the compositor from a content generator. The plurality of content updates comprise first content element updates and second content element updates for 3D objects in a 3D scene. The first content updates occur at a first update rate and the second content updates occur at a second update rate. At block 840, the one or more references are passed from the compositor to a graphics processing unit (GPU) to facilitate loading the first content element updates into a first buffer of the GPU and the second content element updates into a second buffer of the GPU. At block 850, the GPU is commanded by the compositor to generate a first content element from a plurality of values loaded in the first buffer and to generate a second content element from a plurality of values loaded in the second buffer, wherein the GPU is configured to generate at least one of the first or second content elements using interpolation. At block 860, the GPU is commanded by the compositor to render a frame by drawing the first and second content elements from the perspective of the 3D camera.

Turning now to FIG. 9, a flow diagram is provided that illustrates a method 900 for operating a LERB with data pinning. Initially at block 910, transient data is loaded into a first ring stage of a plurality of ring stages of a LERB. At block 920, an associated first ring entry of a plurality of ring entries of the LERB is identified using an indirection table of the LERB. At block 930, persistent data corresponding to the transient data is loaded into the first ring entry. At block 940, the LERB is advanced by updating the indirection table to associate the ring entries with subsequent ones of the ring stages. The LERB is configured to pin data to a pinned ring stage of the ring stages, based on an evaluation using the persistent data, by bypassing an update to the indirection table for the pinned ring stage, thereby maintaining an association between the pinned ring stage and previous persistent data.

Turning now to FIG. 10, a flow diagram is provided that illustrates a method 1010 for operating a LERB. Initially at block 1010, a LERB is accessed. The LERB comprises a plurality of ring stages, a plurality of ring entries, and an indirection table that associates each of the ring stages with at least one of the ring entries. Each of the ring stages is associated with a ring stage function of a plurality of ring stage functions. At block 1020, logic of the associated ring stage function is executed for each of the ring stages. At block 1030, elements of the indirection table are updated to change the association between the ring stages and the ring entries.

Exemplary Operating Environment

Figure 11:
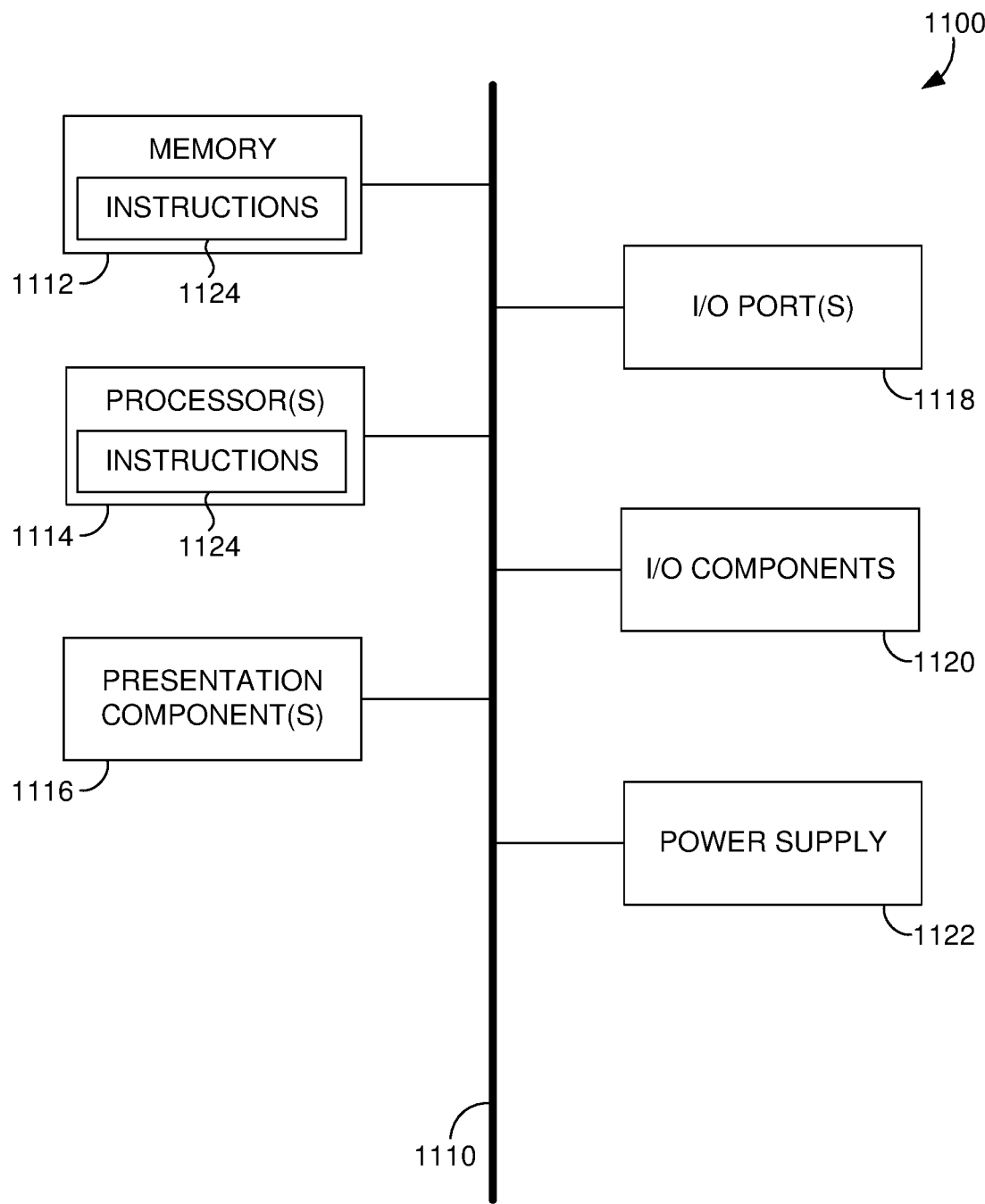
FIG. 11 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 612 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a keyboard, mouse, joystick, game pad, microphone, sensors (e.g., sensors measuring orientation or movement such as a gyro, accelerometer, camera, etc.), satellite dish, scanner, printer, wireless device, etc.

With reference to the systems and components described herein, a system and/or component can refer to a hardware architecture and software framework that support corresponding functionality described herein. The hardware architecture refers to physical components and interrelationships thereof and the software framework refers to software providing functionality that can be implemented with hardware embodied on a device.

An end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the rendering system described herein can include an API library that includes specifications for routines, data structures, object classes, and variables may support the interaction between the hardware architecture of the device and the software framework of the rendering system. These APIs include configuration specifications for the rendering system such that the different components therein can communicate with each other in the rendering system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a rendering system; however the rendering system described herein is merely exemplary. Components can be configured for performing novel aspects of embodiments, where the term "configured for" can refer to "programmed to" perform particular tasks or implement particular abstract data types using code. Further, while embodiments of the present invention may generally refer to the rendering system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
   one or more hardware processors and memory configured to provide computer program instructions to the one or more hardware processors; and
   a compositor configured to utilize the one or more hardware processors to perform operations comprising:
      buffering a plurality of decoupled inputs from a content generator, the plurality of decoupled inputs comprising geometry updates and texture updates for 3D objects in a 3D scene;
      generating, from a user input fed into both the content generator and the compositor, a 3D camera configured to use the user input at a different rate than the content generator;
      identifying, from one of the plurality of buffered decoupled inputs, first and second buffered values, the first buffered value being received before the second buffered value;
      triggering an interpolation between the first and second buffered values to generate interpolated data; and
      triggering a rendering of a frame using the interpolated data and the 3D camera.

2. The computer system of claim 1, the geometry updates being at a first update rate, the texture updates being at a second update rate, wherein at least the first and second update rates are different rates.

3. The computer system of claim 1, wherein the compositor is configured to iterate the operations at an adjustable playback speed.

4. The computer system of claim 1, wherein the compositor is configured to pin data by:
   identifying, from one of the plurality of buffered decoupled inputs, third and fourth buffered values, the third buffered value being received before the fourth buffered value;
   determining that the fourth buffered value fails to satisfy a designated criteria; and
   triggering a rendering of a frame using the third buffered value instead of the fourth buffered value.

5. The computer system of claim 1, wherein the compositor is configured to accept a runtime input that changes a behavior of the compositor at runtime, wherein the runtime input comprises at least one of a change to a playback speed of the compositor or a change to an interpolation setting of the compositor.

6. The computer system of claim 1, wherein the compositor is configured to operate on a combination of a CPU and a GPU.

7. A method for rendering graphics, the method comprising:
   receiving a first content input comprising first content element updates occurring at a first update rate;
   loading the first content element updates into a first buffer associated with a compositor;
   receiving a second content input comprising second content element updates occurring at a second update rate, distinct from the first update rate;
   loading the second content element updates into a second buffer associated with the compositor;
   operating the compositor on a loop that iterates at a third update rate, wherein operating the compositor comprises, for at least one iteration of the loop, causing the compositor to:
      trigger an interpolation between a plurality of values of the first content element updates loaded in the first buffer to generate a first interpolated content element;
      trigger an interpolation between a plurality of values of the second content element updates loaded in the second buffer to generate a second interpolated content element; and
      trigger a rendering of the first interpolated content element and the second interpolated content element in a frame, wherein pinning logic of the compositor is programmable via a configurable setting.

8. The method of claim 7, wherein the first and second buffers are logic-executing ring buffers.

9. The method of claim 7, wherein locations of the first and second buffers are identified by corresponding logic-executing ring buffers.

10. The method of claim 7, wherein the compositor is configured to pin data by:
    identifying, from the first buffer, first and second buffered values of the first content element updates, the first buffered value being received before the second buffered value;
    determining that the second buffered value fails to satisfy a designated criteria; and
    triggering a rendering of a corresponding frame without using the second buffered value.

11. The method of claim 7, wherein the compositor is configured to accept a runtime input that changes a behavior of the compositor at runtime, wherein the runtime input comprises at least one of a change to the third update rate of the compositor or a change to an interpolation setting of the compositor.

12. The method of claim 7, wherein the compositor is configured to operate on a combination of a CPU and a GPU.

13. One or more computer storage media storing computer-useable instructions that, when used by one or more computing devices, cause the one or more computing devices to perform operations comprising:

receiving, at a compositor of the one or more computing devices, a user input that is fed into both the compositor and a content generator;

generating, by the compositor using the user input at a different rate than the content generator, a 3D camera;

receiving, at the compositor, one or more references to a plurality of content updates from the content generator and for 3D objects in a 3D scene, the plurality of content updates being for the 3D objects in the 3D scene and comprising first content element updates at a first update rate and second content element updates at a second update rate, distinct from the first update rate;

passing the one or more references from the compositor to a graphics processing unit (GPU) to facilitate loading the first content element updates into a first buffer of the GPU and the second content element updates into a second buffer of the GPU;

commanding, by the compositor, the GPU to generate a first content element from a first plurality of values loaded in the first buffer and to generate a second content element from a second plurality of values loaded in the second buffer, wherein the GPU is configured to generate at least one of the first or second content elements using interpolation;

commanding, by the compositor, the GPU to render a frame by drawing the first and second content elements from the perspective of the 3D camera.

14. The one or more computer storage media of claim 13, wherein the compositor is configured to iterate the operations at the different rate.

15. The one or more computer storage media of claim 13, wherein the compositor is configured to iterate at an adjustable playback speed.

16. The one or more computer storage media of claim 13, wherein the compositor is configured to pin data by:

identifying, from the first buffer, first and second buffered values, the first buffered value being received before the second buffered value;

determining that the second buffered value fails to satisfy a designated criteria; and commanding, by the compositor, the GPU to render a frame using the first buffered value instead of the second buffered value.

17. The one or more computer storage media of claim 13, wherein the compositor is configured to accept a runtime input that changes a behavior of the compositor at runtime, wherein the runtime input comprises at least one of a change to a playback speed of the compositor or a change to an interpolation setting of the compositor.

18. The one or more computer storage media of claim 13, wherein the first and second buffers are portions of corresponding logic-executing ring buffers.

19. The one or more computer storage media of claim 13, wherein the one or more references comprise at least one handle to a locally allocated copy of one of the plurality of content updates.

* * * * *